United States Patent
Gustafsson et al.

(10) Patent No.: US 7,158,866 B2
(45) Date of Patent: Jan. 2, 2007

(54) ADAPTIVE FILTER MODEL FOR MOTOR VEHICLE SENSOR SIGNALS

(75) Inventors: Fredrik Gustafsson, O G Svenssons väg (SE); Stefan Ahlqvist, Stormvägen (SE); Marcus Drevö, Åbylundsgatan (SE); Urban Forssell, Fårsaxvägen (SE); Niclas Persson, Trumslagaregatan (SE)

(73) Assignee: Nira Dynamics AB, Linkoping (SE)

( * ) Notice: Subject to any disclaimer, the term of this patent is extended or adjusted under 35 U.S.C. 154(b) by 110 days.

(21) Appl. No.: 10/257,596

(22) PCT Filed: Apr. 12, 2001

(86) PCT No.: PCT/SE01/00797

§ 371 (c)(1), (2), (4) Date: Jan. 9, 2003

(87) PCT Pub. No.: WO01/76925

PCT Pub. Date: Oct. 18, 2001

(65) Prior Publication Data

US 2004/0199300 A1    Oct. 7, 2004

(30) Foreign Application Priority Data

Apr. 12, 2000  (SE) .................................. 0001353
Jun. 16, 2000  (SE) .................................. 0002212

(51) Int. Cl.
*G06F 7/00*   (2006.01)

(52) U.S. Cl. ........................................................ 701/1

(58) Field of Classification Search .................... 701/1, 701/36, 45, 48, 58, 82, 71–72, 207, 216–217, 701/220–221

See application file for complete search history.

(56) References Cited

U.S. PATENT DOCUMENTS

| | | | |
|---|---|---|---|
| 4,680,715 A * | 7/1987 | Pawelek | 701/207 |
| 5,166,882 A | 11/1992 | Stambaugh | |
| 5,506,794 A | 4/1996 | Lange | |
| 5,668,724 A | 9/1997 | Ehret et al. | |
| 5,860,480 A | 1/1999 | Jayaraman et al. | |
| 6,427,102 B1 * | 7/2002 | Ding | 701/34 |
| 6,459,990 B1 * | 10/2002 | McCall et al. | 701/220 |

FOREIGN PATENT DOCUMENTS

| | | |
|---|---|---|
| DE | 4123053 A1 | 1/1993 |
| EP | 0 595 681 A1 | 5/1994 |
| WO | WO 98/10297 A1 | 3/1998 |

OTHER PUBLICATIONS

Gustafsson Fredrik, Monitoring Tire-Road Friction Using The Wheel Slip, 1996 IEEE Symposium o Computer Aided Control System Design, 8 pages, Sweden.

* cited by examiner

*Primary Examiner*—Thu V. Nguyen
(74) *Attorney, Agent, or Firm*—Albihns Stockholm AB

(57) ABSTRACT

A sensor system for combining first and second sensor signals, and generating a physical parameter values dependent on said sensor signals used in autocalibrating sensors improving the performance and quality of existing sensor signals and virtual sensors realizing new sensors by combining and integrating in adaptive filter models sensor signals representing same or different types of physical parameters.

48 Claims, 9 Drawing Sheets

ADAPTIVE FILTER MODEL FOR MOTOR VEHICLE SENSOR SIGNALS

FIELD OF THE INVENTION

The present invention relates generally to a system for integrating sensors of physical parameters, and more specifically to a system for sensor fusion in a wheeled vehicle.

BACKGROUND OF THE INVENTION

In the current development within vehicle technology there is an increasing interest in enhancing the safety and the manoeuvrability of vehicles by means of a number of support systems. Examples of well-known support systems in wheeled vehicles are anti-lock brake systems (ABS), traction control systems and tire pressure estimation systems. This kind of systems are usually provided with more or less complex sensors such as gyroscopes and wheel speed sensors to gather information about physical parameters affecting the vehicle.

Along with the development of technology there is an increasing demand for safety enhancing equipment in standard cars, something which is not always compatible with an acceptable price level on this segment of cars. There is therefore a need for developing cost efficient sensor equipment while improving the usability of the sensor signals.

An important parameter for automatic support systems, such as dynamic stability traction control (DSTC), is the course direction of the vehicle. The course is usually expressed in terms of the yaw angle, which is the direction of motion relating to a longitudinal axis of the vehicle, and the yaw rate, which is the angular velocity of the rotation of the vehicle around its centre of gravity in the horizontal plane.

In a simple approach, the yaw rate is independently calculated from different sensors in the vehicle, such as a gyro sensor, ABS sensors, an accelerometer sensor or a steering wheel angle sensor, and thus resulting in different values of the yaw rate. These values have been compared and voting has been used to decide which information to use.

Sensor signals generally comprise a parameter value and an offset from the true parameter value. The offsets are due to imperfect knowledge of the parameters and their dependencies, and the offsets vary in time due to for example temperature changes and wear. An accurate estimation of the offsets is crucial to the ability of accurately estimating the parameter value itself. The traditional way to improve sensor signals is to use a low pass filter in order to get rid of high frequency variations, and sometimes an offset can be estimated using long term averaging. Averaging has its shortcomings. For example in yaw rate estimation, a systematic circular driving will give the same effect as an offset. Furthermore, if two sensor signals measuring the same physical parameter are averaged, an improved estimate of the parameter may be obtained but it does not help in estimating the offset.

The perhaps most well known support parameter for the driver of a wheeled vehicle is the velocity. The vehicle velocity may be estimated based on the angular velocity of the driven wheel, however with an inaccuracy due to wheel slip, wheel skid or varying tire diameter. The standard approach to compute velocity is to use the wheel speed signals from the wheel speed sensors and possibly averaging over left and right wheels. To avoid errors due to wheel slip the non-driven wheels are preferably used. This approach has however shortcomings during braking when the wheels are locked and during wheel spin on 4 wheel-driven (WD) vehicles. For 4 WD vehicles an additional problem is that even during normal driving there will be a small positive velocity offset due to the wheel slip.

THE STATE OF THE ART

An example of the state of the art sensor utilisation is shown in U.S. Pat. No. 5,878,357 to Sivashankar et al. This piece of prior art is directed to vehicle yaw rate estimation by a combination of a kinematic yaw rate estimation and a dynamic yaw rate estimation using accelerometers. A kinematic yaw rate estimate is weighted with a vehicle lateral acceleration at the centre of gravity, and steering angle and vehicle forward speed are incorporated into a Kalman filter for achieving a dynamic vehicle yaw rate estimate. This system uses relatively low-cost sensor components but is sensitive to difficult driving cases and errors in the wheel radii, for example due to varying tire pressure. Another drawback is that it requires wiring through the whole car in order to collect sensor signals from an accelerometer at the front as well as the rear of the car.

Another example of prior art directed to yaw rate measuring is found in U.S. Pat. No. 5,274,576 to Williams. This prior art uses a solid state rate gyrometer, the accuracy of which is known to depend on the ambient temperature. Measuring means provides a velocity signal, a steering angle and a lateral acceleration signal, which are all used in a correction means in order to remove bias errors from the output signal of the gyrometer. It is noted that this system is basically a low pass filter only compensating for long term bias errors.

The U.S. Pat. No. 5,860,480 to Jayaraman et al shows a method for determining pitch and ground speed of an earth moving machine, and is directed to estimating certain operating parameters. This prior art seeks to overcome problems of noise and bias in sensor signals. Using a sensor measurement model, a machine process model and Kalman filter update equations the pitch, the pitch rate and ground speed are estimated as a function of sensed pitch and ground speed signals.

The European Patent No. EP 0 595 681 A1 to Regie Nationale des Usines Renault shows a method for determining the speed of a vehicle by processing sensed wheel angular velocity in a Kalman filter.

THE OBJECT OF THE INVENTION

The general problem to be solved by the present invention is to improve the usability of signals from existing sensors measuring a first physical parameter.

Aspects of the problem are: to improve the accuracy of such sensors signals;

to achieve a virtual sensor signal for a second physical parameter dependent on said first physical parameter;

to use and combine sensor information from different available sources in order to achieve improved parameter estimates or virtual sensor signals;

to accurately estimate and eliminate offsets from parameter values in the sensor signals.

A further and more specific aspect of the problem is to provide an improved computation of a course indication in the shape of yaw angle and yaw rate for a wheeled vehicle.

Yet another specific aspect of the problem is to provide an improved estimation of the velocity of a wheeled vehicle.

A further aspect of the problem is to compute the actual fuel level and instantaneous fuel consumption for any engine, where offset distorted measurements of the same quantities are available.

Yet another specific aspect is to compute the roll angle of a vehicle, in particular for motorcycles.

SUMMARY OF THE INVENTION

The object of the invention is achieved by processing a plurality of sensor signals in an adaptive or recursive filter thereby producing an optimized estimation of a first The European Patent No. EP 0 595 681 A1 to Regie Nationale Des Usines Renault shows a method for determining the speed of a vehicle by processing sensed wheel angular velocity in a Kalman Filter. The Kalman filter is based on a model that depends on an absolute reference, and more specifically in the assumption that one of the sensor signals, i.e. the velocity signal, is free from errors, whereas an offset error is modelled for the other signal, i.e. the acceleration signal. In case of errors in the assumedly error free reference signals, this method will result in erroneous parameter signal estimation. physical parameter detected by said sensors. In accordance with the invention, a particularly advantageous recursive filter is provided by a Kalman filter. In the invention, the Kalman filter is used as a framework for processing related sensor signals and estimating their respective offsets. These related sensor signals do not necessarily have to measure the same physical parameter, and in embodiments of the invention they usually represent different parameters. Besides giving an accurate estimate of the offset, the Kalman filter also has the advantageous possibility of attenuating noise.

The invention achieves an increase of performance in existing sensors by enhancing the sensor signal. Furthermore, new information is found by combining and processing sensor signals and associate the result with other physical or operating parameters than those directly related with the sensors.

According to an aspect of the invention, the accuracy of sensor signals are highly improved by combining the signals of a plurality of existing or simple add-on sensors in the recursive filtering means.

According to another aspect of the invention, a virtual sensor signal for a second physical parameter dependent on one or more first physical parameters is generated by combining sensors of different type sensing different first physical parameters by means of combined sensor signals from real sensors. In other terms, all available information from sensors in the vehicle is systematically fused in a recursive filter, preferably a Kalman filter.

When applying the sensor fusion in accordance with the invention in computing a yaw rate value, at least two sensor signals are input into a Kalman filter in order to minimize the error in an estimate signal representing the yaw rate value. In a preferred embodiment, these sensors signals are a yaw rate signal taken from a gyro, wheel speed signals taken from an ABS equipment, possibly also a lateral yaw rate signal computed from a lateral accelerometer and steering wheel angle signals. An accurate yaw rate value can for example be applied in lateral slip computation, which is used in stability systems and friction estimation. Furthermore, there are effects of the second order, for example an estimation of absolute tire radii and consequently also absolute velocity. Moreover, the filtering process provides computations of differences in tire radii as well as signals for diagnosis of faults in the respective sensors. The diagnosis signals may be used to warn the driver or be stored in a fault report to be used in connection with service of the vehicle.

An accurate estimation of vehicle velocity is achieved in accordance with an embodiment of the invention wherein wheel speed sensor signals are combined with an accelerometer signal and processed in a filtering process in accordance with the above description. In accordance with the invention, the velocity is accurately computed even during braking and when the wheels are locked. For a 4 WD vehicle or when non-driven wheel speed signals are not available, the invention compensates for wheel slip and in addition to velocity also gives acceleration information. Other parameters that are derived in embodiments of the invention are slip-offset e.g. usable for tire pressure estimation in 4 WD vehicles, slip-slope e.g. usable for tire friction estimation in 2 WD and 4 WD vehicles, acceleration offset and the wheel velocity in the drive direction. These embodiments as well as detection of aquaplaning are examples of application of theory for the longitudinal stiffness of tires.

The slip of a vehicle wheel is a function of the momentum applied on a wheel, wherein the slip-offset is a constant term of the function and the slip-slope is the constant of proportionality between the applied momentum and the slip.

There are different further aspects that are relevant to different kinds of vehicles. Yaw rate and absolute velocity estimation is perhaps most appropriate for cars and trucks. For motorcycles, the determination of roll angle is important for an ABS and spin control, since less tire forcess can be utilised in cornering. Also, headlight control can be implemented dependent on roll angle. Roll angle estimation is furthermore crucial for roll-over detection, used in some airbag control units. Similarly to yaw rate estimation in cars, this can be done by using wheel speed and a lateral-vertical accelerometer pair. Such a roll angle estimation carried out without using a roll gyro is an example of a virtual sensor, where only indirect measurements are used to compute the physical quantity. It is here crucial to find and compensate for the accelerometer offsets, which is conveniently achieved with the aid of the invention. As a further support, a roll gyro and longitudinal accelerometer can be incorporated in the algorithm. Another example of great practical importance is to detect aqua-planing quickly, for cars, trucks and motorcycles.

Other aspects and embodiments of the invention are disclosed in the description of detailed embodiments and the claims.

BRIEF DESCRIPTION OF THE DRAWINGS

The invention will now be further described by means of exemplifying embodiments in conjunction with the accompanying drawings, in which.

DETAILED DESCRIPTION OF EMBODIMENTS

Figure 1A:
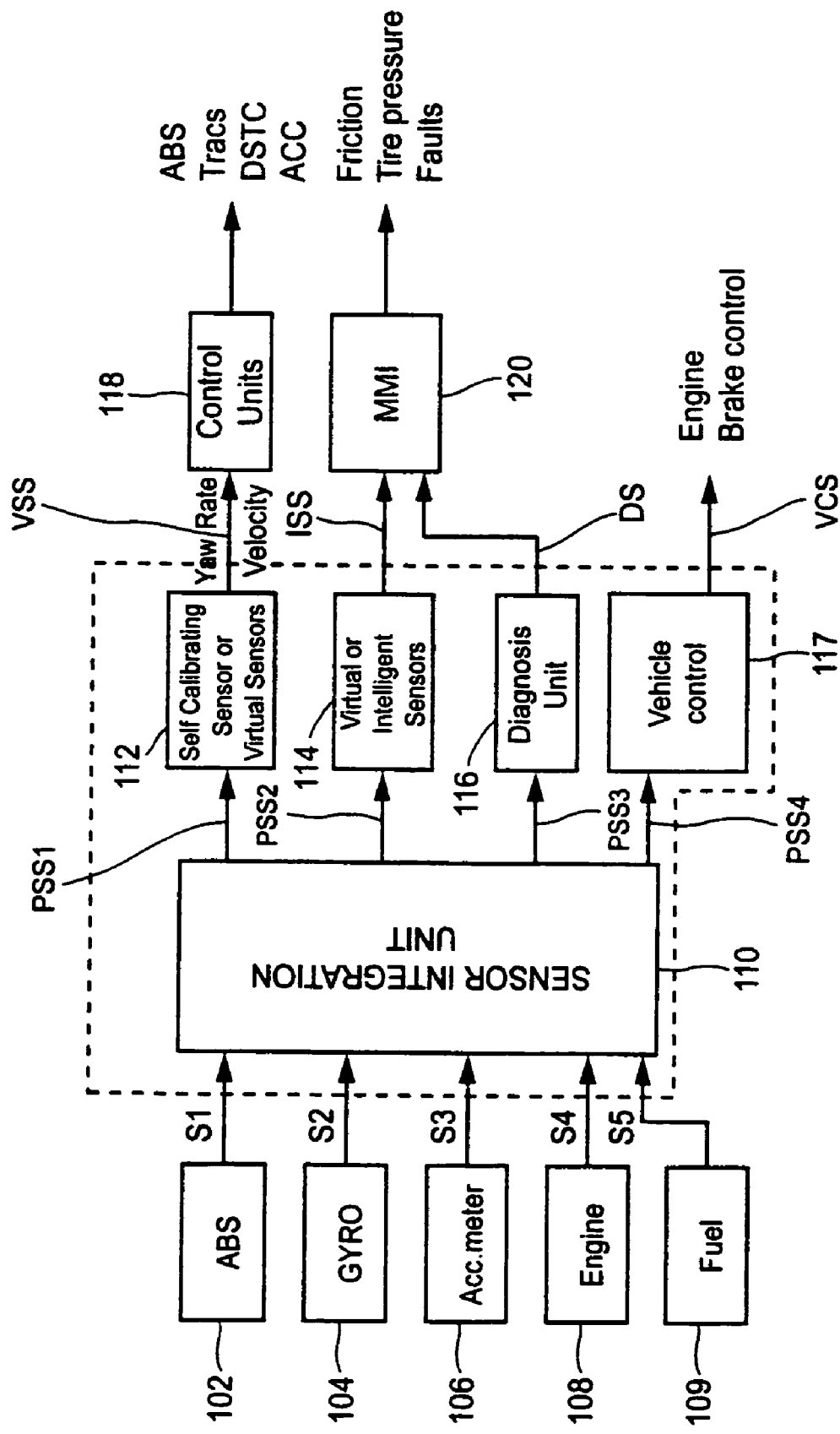
FIG. 1A–1D show schematic block diagrams embodiments of the invention.

The invention is based on the following general idea of sensor fusion, which is here described by way of example in terms of matrix algebra. This example relates to two sensors detecting the same physical parameter, but in different embodiments of the invention signals from sensors detecting different parameters may be integrated.

Two different sensors sensing the same varying physical parameter give separate measurements yi(t) of a the parameter x, where each measurement has an offset bi with an offset scaling ci(t) according to a known function of time. The measurements can be expressed algebraically as the equations:

$$y1(t)=x(t)+c1(t)b1 \quad (1)$$

$$y2(t)=x(t)+c2(t)b2. \quad (2)$$

These two equations have three unknowns and is therefore insoluble, and the offsets cannot be directly eliminated.

When two measurements y1(1),y2(1) and y1(2),y2(2) are available, there are two more equations and only one more unknown, i.e. four equations and four unknowns. Thus, the offsets and the variable parameter values x(1),x(2) can be solved under the condition that there is no linear dependency in data In this example, the linear independency condition is:

$$c1(1)/c1(2) \neq c2(1)/c2(2). \quad (3)$$

If, for example, c1 is constant and c2(t) is the velocity vx(t), linear independency occurs when the velocity has changed between two measurements. This leads to observability and identifiability. Typically, measurements would be carried out by sensors delivering a continuous or discrete sensor output signal which is sampled into a digital data processing system. The samples are collected in a per se known manner with a predetermined sampling frequency, thus giving rise to a corresponding number of observations in the shape of equations to process.

In practice there is a measurement noise added to each of the observations. In order to eliminate the noise, certain embodiments of the invention are devised to collect a number of observation samples large enough to constitute an overdetermined equation system and to compute the least square solution.

The invention also makes use of the a priori knowledge that the parameter variable x is a correlated sequence that cannot change arbitrarily fast between two samples. This property of the parameter variable x is used in a recursive filter, preferably a Kalman filter, into which the sampled observations input.

General Setting

The invention is generally implemented in a digital or analogue sensor control system of a car. Such a system typically includes wired, optical or wireless data communication links for communicating the output of a sensor to a control unit. The control unit is provided with a data processor, which in preferred embodiments is a digital processor having a data storage memory and signal input and output ports. The digital processor is programmed with a computer program product being provided with means for directing the processor to perform the functions and the steps of the inventive method. In an analogue implementation of the inventive concept, the control unit is provided with circuit elements specifically devised to perform the functions of the inventive method.

FIG. 1 shows a schematic diagram showing the functional blocks of the invention. Sensors or sensor signal suppliers 102,104,106,108, capable of generating sensor signals S1,S2,S3,S4 dependent on or representing a respective physical parameter, are coupled to a sensor integration unit 110. For example, in one embodiment the ABS is used as sensor signal supplier 102, the sensor 104 is a gyro, the sensor 106 is one or more accelerometers and the engine is a sensor signal supplier 108. The sensor integration unit comprises a recursive filter, preferably a Kalman filter, devised to provide an estimate of a predetermined physical parameter, and outputs a physical parameter signal PSS1 to a first sensor signal processing unit, more specifically a self calibrating sensor, here called a virtual sensor signal processing unit 112. The virtual sensor signal processing unit 112 is devised to compute one or more virtual sensor signals VSS based on the physical parameter signal PSS1. The computed virtual sensor signal is for example the yaw rate Ψ(dot), the velocity vx of the vehicle and the fuel consumption d Vfuel/dt. The virtual sensor signal is then communicated to one or more control units 118, for example devised for controlling an ABS, a traction control system, a dynamic stability traction control system (DSTC) or an adaptive cruise control system (ACC). A roll angle detector is an example of both a virtual sensor when realised without a roll gyro and a self-calibrating sensor realised in conjunction with a roll gyro. The roll angle estimate can be used in roll-over detection in cars and for improving ABS and anti-spin control and enabling headlight control in motorcycles. With the help of these virtual signals, aqua-planing can be detected with high reliability.

In the embodiment shown in FIG. 1, the sensor integration unit 110 outputs a second physical parameter signal PSS2 to a second sensor signal processing unit, which perhaps more properly constitutes a virtual sensor but in this figure is called an intelligent sensor processing unit 114, devised to compute a complementary, intelligently computed sensor signal ISS used in a driver information processing unit 120. Such intelligent sensor signals may for example represent friction and tire conditions such as pressure or vibration. The sensor integration unit 110 is also devised to deliver a third physical sensor signal PSS3 communicated to third sensor signal processing unit in the shape of a diagnosis signal processing unit 116, which outputs a diagnose signal DSS to the driver information processing unit 120. The driver information processing unit in its turn outputs signals for example indicating friction conditions, tire pressure or faults in predetermined car components. Furthermore, a fourth physical parameter signal PSS4 may be delivered by the sensor integration unit to a fourth sensor signal processing unit, namely a vehicle control signal processing unit 117 devised to generate and deliver suitable vehicle control signals VCS for example to vehicle operating apparatuses such as engine or brake control.

Self-Calibrating Sensor

Figure 1B:
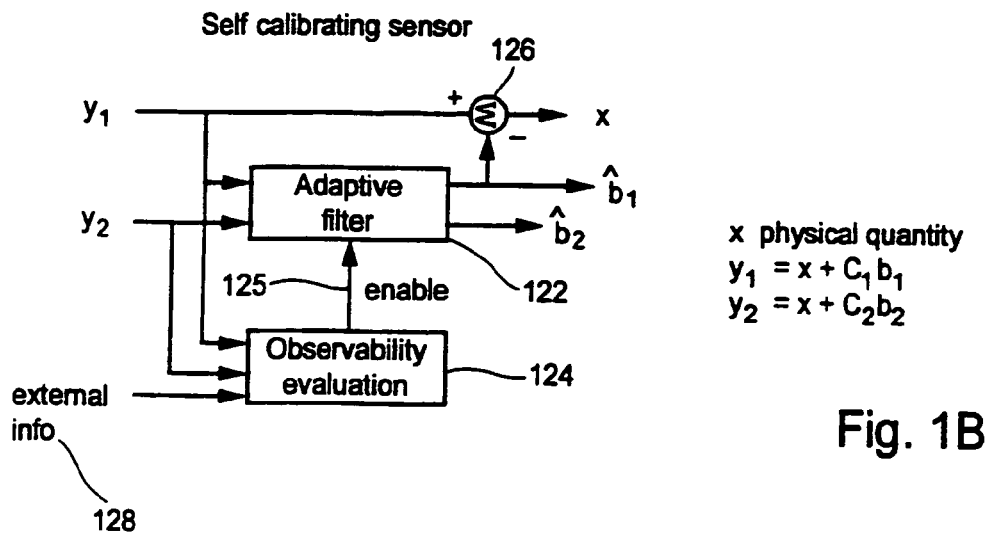

FIG. 1B shows schematically the structure of a self-calibrating sensor in accordance with one embodiment of the invention, as explained in connection with equations 1–3. Two sensor signals y1 and y2 representing a physical parameter are input into an adaptive filter 122 deviced to estimate in accordance with a predeterermined model and deliver as as output signal offsets b1(hat) and b2(hat). The sensor signals y1,y2 are also input into an observability evaluation functionality together with possible external info 128, the evaluation unit being deviced to output an enable signal 125 to the adaptive filter 122 when the conditions allow observability. The offset signal b1(hat) is joined with the sensor signal y1 in a substraction stage 126 where the value of the offset b1(hat) is substracted from the sensor signal value to produce a value or a quantity of a parameter X.

Figure 1C:
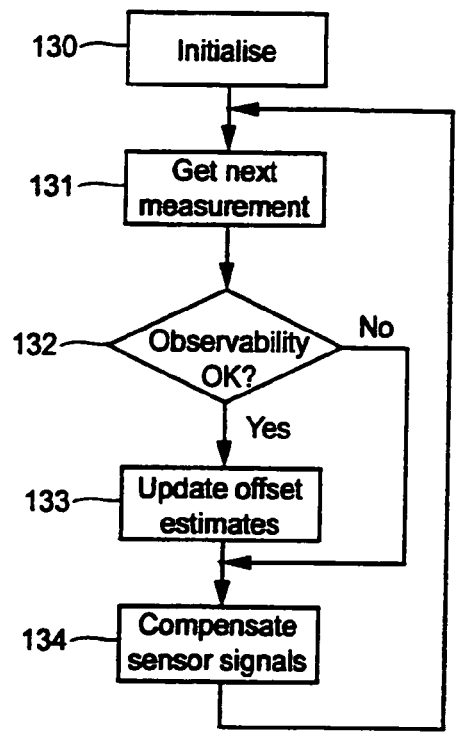

FIG. 1C shows a general flow chart for the steps in a sensor fusion system, such as a self calibrating sensor in accordance with the invention, comprising the following steps:
Initializing the system;
Receiving as an input the next measurement or sample from the sensors;
Checking observability of parameter;
If observability is OK then updating offset estimates;
After uppdating of offset estimates or if observability is not OK then compensate sensor signals with the offset output from the adaptive filter.

Virtual Sensor

Figure 1D:
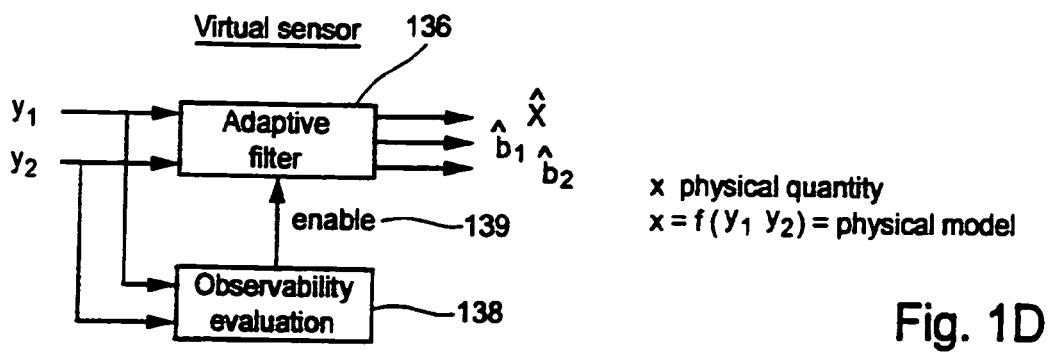

FIG. 1D shows schematically an example of a virtual sensor comprising an adaptive filter 136 based on a predetermined model integrating model parameters values representing first and second different physical or operating parameters. First and second sensor signals y1 and y2 representing said first and second different parameters are input into the filter 136 and into an observability evaluation unit 138. The observability evaluation unit 138 checks whether observability for the physical parameters is fulfilled and if so outputs an enable signal 139 to the adaptive filter 136. In enabled condition, the adaptive filter 136 calculates and outputs an estimate of a physical quantity or value X(hat) together with an estimate of offset values b1(hat) and b2(hat). The physical quantity X(hat) is the value of a physical model X as a function f(y1,y2) dependent on the sensor signals y1 and y2.

Yaw Rate Computation

Figure 2:
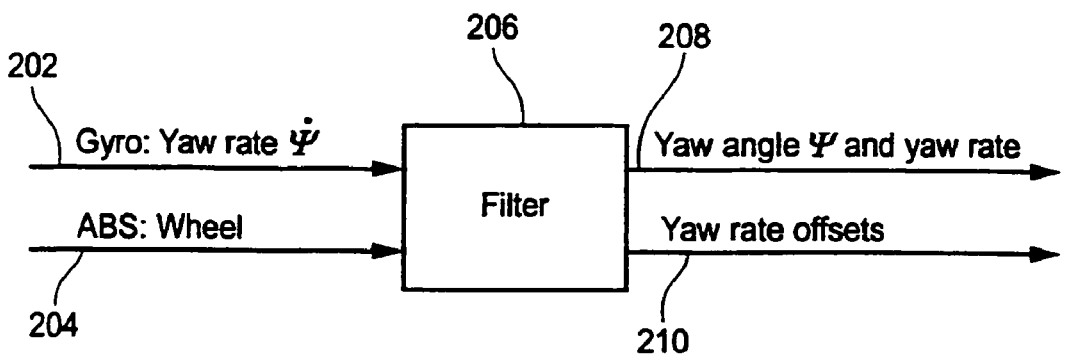
FIG. 2A shows schematically an embodiment of the invention applied in yaw rate computation.
FIG. 2B shows the invention applied in velocity computation.
FIG. 2C shows the invention applied in fuel consumption computation.
FIG. 2D shows the invention applied in slip slope computation.

One embodiment of the invention is directed to achieve an adaptive high precision yaw rate sensor by combining sensor signals from a gyro and from wheel angular velocity sensors of an ABS and by computing an accurate yaw rate by means of an adaptive filter. Specific embodiments may comprise further sensor signals, for example the signals from a lateral accelerometer, in order to further enhance the performance of the sensor. FIG. 2 shows schematically a yaw rate signal $\dot{\psi}$ gyro 202 from a gyro and wheel angular speed signals 204 from an ABS being input in a filter 206 in accordance with the invention. The filter 206 outputs a computed yaw angle $\psi$, yaw rate $\dot{\psi}$ 208 as well as yaw rate offset values.

Figure 3:
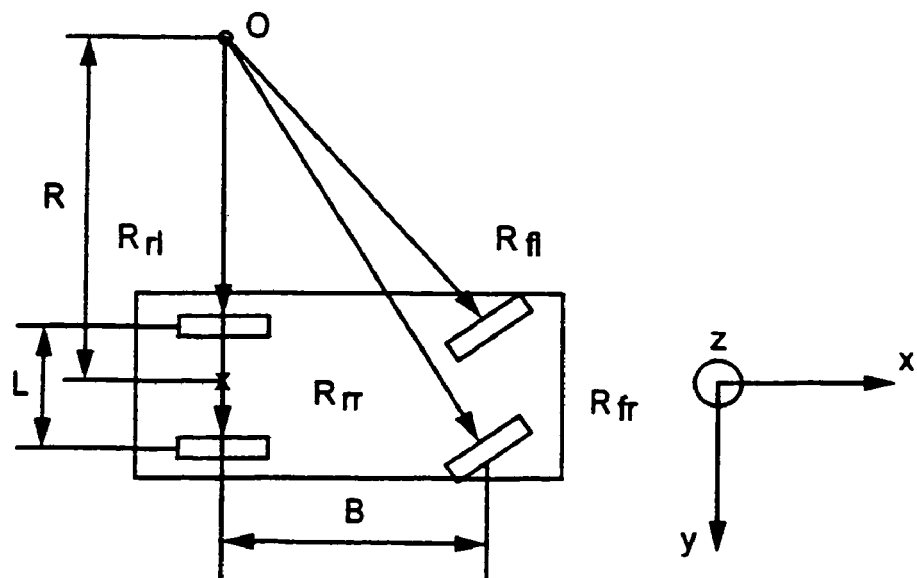
FIG. 3A shows an embodiment of an autocalibrating sensor in accordance with the invention.
FIG. 3B shows a schematic drawing which defines the geometric relations of a four wheeled vehicle.
Figure 2:
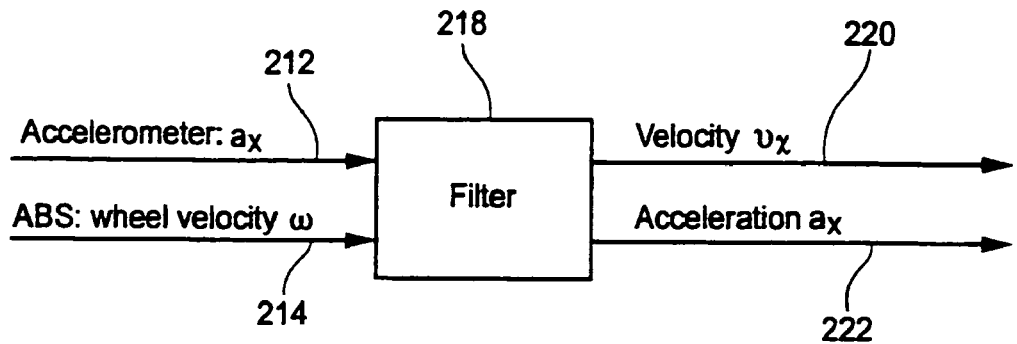
Figure 2:
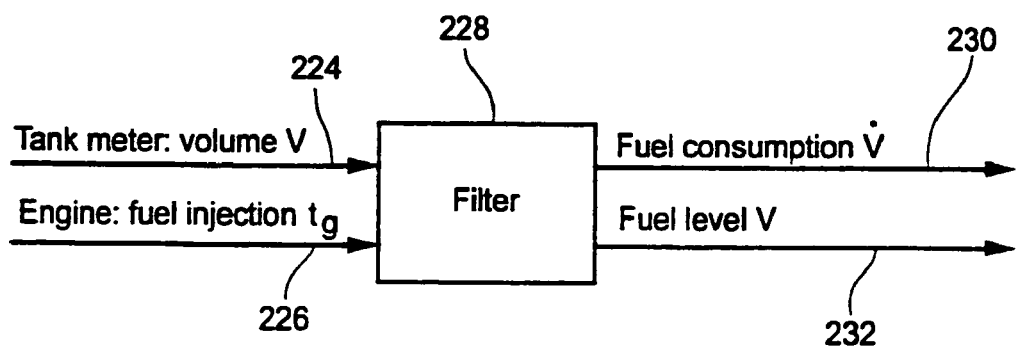
Figure 2:
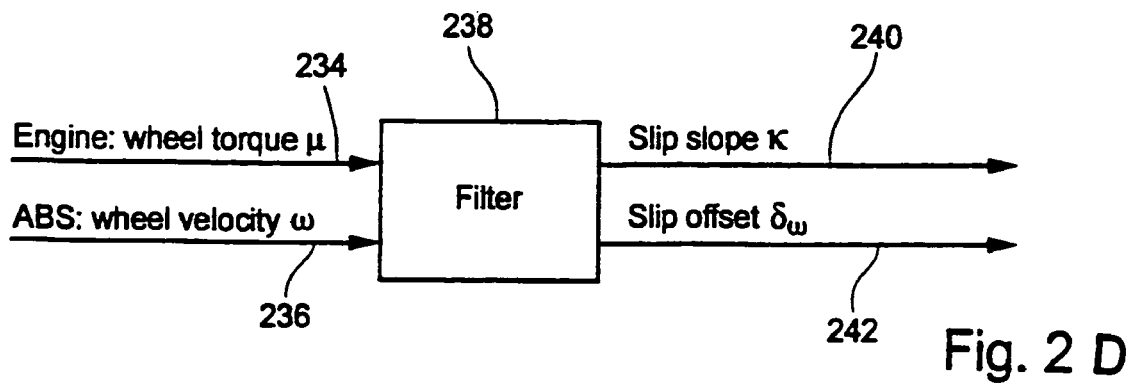
Figure 3:
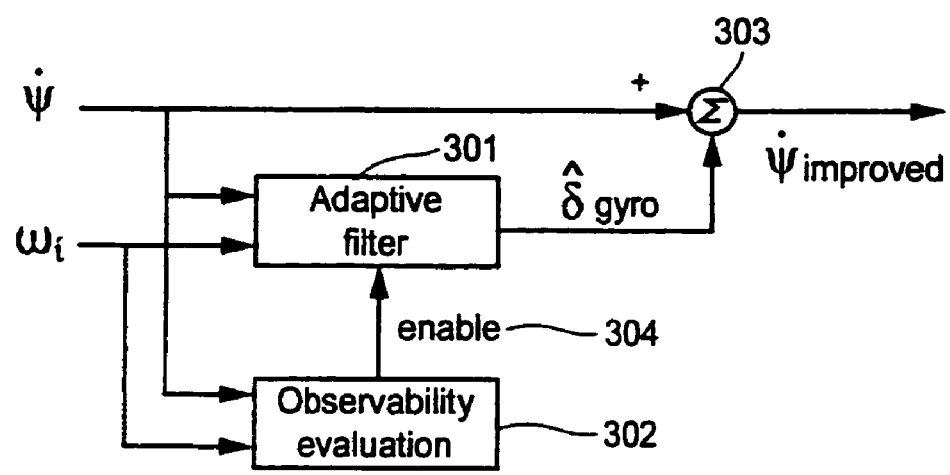

FIG. 3A shows shematically a more detailed autocalibrating sensor for determining yaw rate, wherein a yaw rate signal $\dot{\psi}$ from a gyro and angular velocity signals $\omega i$ for the wheels are input into an adaptive filter 301 as well as into an observability evaluation unit 302. The evaluation unit 302 generates and inputs into the adaptive filter an enable signal 304 when the sensed parameters are observable. The adaptive filter 301 generates as an output a yaw rate offset value $\delta$gyro representing the offset of the yaw rate signal from the gyro. The yaw rate $\dot{\psi}0$ and the offset value $\delta$gyro are joined in a summation unit 303 producing a $\dot{\psi}$-improved as an output.

FIG. 3B shows a simple drawing of a four wheeled vehicle, which drawing defines the geometric relations for the wheel velocities during cornering used to compute yaw rate from wheel speed signals. More specifically, the relations are used to compute the curve radius, where R is defined as the distance to the centre of the rear wheel axle from a predetermined point O, L is the lateral distance between the wheels on one axle and B is the longitudinal distance between front and rear wheel axle. The wheels are in this example denoted as rl for rear left, rr for rear right, fl for front left and fr for front right. A coordinate system indicating the x,y, and z-directions is also drawn in FIG. 3B. For the sake of clarity of the drawing, the coordinate system is drawn in front of the vehicle, but is in reality typically positioned in the centre of gravity of the vehicle.

For the sake of simplicity of the explanation of the invention, this exemplifying embodiment is based on relations assuming there is no lateral movement. In the relations:

$$\dot{\psi} = \frac{v_x}{R} = v_x R^{-1} \qquad (4), (5)$$

$$a_y = \frac{v_x^2}{R} = v_x^2 R^{-1} = v_x \dot{\psi}$$

$\dot{\psi}$ is the yaw rate from a gyro;
vx is the velocity of the vehicle in the x-direction;
ay is the acceleration in the y-direction. The curve radius is computed according to the following relation, where R is defined as the distance to the center of the rear wheel axle, $$\frac{v_{rr}}{v_{rl}} = \frac{R_{rr}}{R_{rl}} = \frac{R + L/2}{R - L/2} \qquad (6)$$

The angular wheel velocities $\omega$ for each of the respective wheels are received from an ABS and the inverse $R^{-1}$ of R is solved in order to avoid numerical problems in certain driving cases, e.g. driving straight ahead. This results in $$R^{-1} = \frac{2}{L} \frac{\frac{v_{rl}}{v_{rr}} - 1}{\frac{v_{rl}}{v_{rr}} + 1} = \frac{2}{L} \frac{\frac{\omega_{rl} r_{rl}}{\omega_{rr} r_{rr}} - 1}{\frac{\omega_{rl} r_{rl}}{\omega_{rr} r_{rr}} + 1} \qquad (7)$$

where the wheel radius is denoted r.

The wheel radii ratio is subject to an offset:

$$\frac{r_{rl}}{r_{rr}} \equiv 1 + \delta_{ABS} \qquad (8)$$

The influence of the offset on the denominator is negligible, so according to embodiments of the invention the following expression is used for inverse curve radius:

$$R^{-1} = \frac{1}{L} \frac{2}{\frac{\omega_{rl}}{\omega_{rr}}+1} \left( \frac{\omega_{rl}}{\omega_{rr}} (1+\delta_{ABS}) - 1 \right) \quad (9)$$

$$= R_m^{-1} + \frac{1}{L} \frac{2}{\frac{\omega_{rl}}{\omega_{rr}}+1} \frac{\omega_{rl}}{\omega_{rr}} \delta_{ABS}$$

wherein the computable quantity $$R_m^{-1} = \frac{1}{L} \frac{2}{\frac{\omega_{rl}}{\omega_{rr}}+1} \left( \frac{\omega_{rl}}{\omega_{rr}} - 1 \right) \quad (10)$$

is used for the inverse curve radius.

Finally, the velocity at the center of the rear wheel axle is $$v_x = \frac{\omega_{rl} + \omega_{rr}}{2} r \quad (11)$$

where r denotes the nominal wheel radius.

In a practical implementation of this embodiment, the sensor measurements are:

$y_1(t)$ from a yaw rate sensor, i.e. gyro signal;

$y_2(t) = v_x R_m^{-1}$, from ABS sensors, $R_m^{-1}$ is computed as above; and possibly $y_3(t)$ from a lateral acceleration sensor.

It should be noted that when a lateral accelerometer is used, this is preferrably supported by a vertical accelerometer to compensate for non-horizontal movements of the vehicle.

All these sensor measurements are subject to an offset and measurement noise given by the relations:

$$y_1(t) = \dot{\psi}(t) + \delta_{YR} + e_1(t) \quad (12)$$

$$y_2(t) = v_x R_m^{-1} + e_2(t)$$

$$= \dot{\psi}(t) + v_x \frac{1}{L} \frac{2}{\frac{\omega_{rl}}{\omega_{rr}}+1} \frac{\omega_{rl}}{\omega_{rr}} \delta_{ABS} + e_2(t)$$

$$y_3(t) = v_x \dot{\psi}(t) + \delta_{ACC} + e_3(t)$$

where δABS is an offset that depends on relative tire radius between left and right wheels.

As has been described above, the measurement signals are treated in a filter. A general filter description is given in the following section. In one embodiment, the offset is estimated by means of the least squares method. So, eliminating the yaw rate from the first two measurements yields a linear regression in the two offsets:

$$\bar{y}(t) = \varphi^T(t)\bar{\delta} + \bar{e}(t) \quad (13)$$

where:

$$\bar{y}(t) = y_1(t) - y_2(t) \quad (14)$$

-continued $$\varphi(t) = \left( 1, v_x \frac{1}{L} \frac{2}{\frac{\omega_{rl}}{\omega_{rr}}+1} \frac{\omega_{rl}}{\omega_{rr}} \right)^T$$

$$\bar{\delta} = (\delta_{YR}, \delta_{ABS})^T$$

$$\bar{e}(t) = e_1(t) - e_2(t)$$

Using also an accelerometer, the regression quantities are $$\bar{y}(t) = y_1(t) - \frac{y_3(t)}{v_x} \quad (15)$$

$$\varphi(t) = \left( 1, \frac{1}{v_x} \right)^T$$

$$\bar{\delta} = (\delta_{YR}, \delta_{ACC})^T$$

$$\bar{e}(t) = e_1(t) - \frac{e_2(t)}{v_x}$$

The least squares estimate is computed by $$\hat{\delta} = \left( \frac{1}{N} \sum_{i=1}^{N} \varphi(t)\varphi^T(t) \right)^{-1} \frac{1}{N} \sum_{i=1}^{N} \varphi(t)y(t) \quad (16)$$

The important question of identifiability, that is, under what conditions are the offsets possible to estimate, is answered by studying the rank of the matrix to be inverted in the LS solution. For the accelerometer sensor, the matrix is given by:

$$\frac{1}{N} \sum_{i=1}^{N} \varphi(t)\varphi^T(t) = \begin{pmatrix} 1 & \frac{1}{N} \sum_{i=1}^{N} \frac{1}{v_x(t)} \\ \frac{1}{N} \sum_{i=1}^{N} \frac{1}{v_x(t)} & \frac{1}{N} \sum_{i=1}^{N} \frac{1}{v_x(t)^2} \end{pmatrix} \quad (17)$$

In short, this matrix has full rank if and only if the velocity changes during the time horizon. Furthermore, the more variation, the better estimate. Similarly, the offsets are identifiable from yaw rate and ABS sensors if the velocity or the curve radius changes anytime. In accordance with the invention, the offsets are estimated adaptively by recursive least squares (RLS) algorithm, least mean square (LMS) or a Kalman filter.

In real time implementations of the invention, the Kalman filter is preferred and improves the performance over RLS in the following way:

Firstly, a model for the variation of the true yaw rate can be incorporated in the Kalman filter. For instance, the yaw rate may be limited to 5 Hz maximum frequency variation.

Secondly, different time-variations of the sensor offsets can be used. For instance, temperature can influence the gyro offset variation, a cold start can make the filter forget more of the gyro offset than the ABS offset.

The Kalman filter is completely specified by a state space equation of the form $$x(t+1) = Ax(t) + Bv(t)$$
$$y(t) = Cx(t) + e(t) \quad (18)$$

where the covariance matrices of v(t) and e(t) are denoted Q and R, respectively. The unknown quantities in the state vector x(t) are estimated by a recursion $$\hat{x}(t+1) = A\hat{x}(t) + K(t;A,B,C,Q,R)(y(t) - C\hat{x}(t)) \quad (19)$$

where the filter gain K(t;A,B,C,Q,R) is given by the Kalman filter equations. Thus, the problem when designing an implementation is to setup the state space model.

An exemplifying embodiment uses the state vector:

$$x(t) = \begin{pmatrix} \dot{\psi}(t) \\ \ddot{\psi}(t) \\ \delta_{YR} \\ \delta_{ABS} \end{pmatrix} \quad (20)$$

and a continuous time state space model is:

$$\dot{x}(t) = \begin{pmatrix} 0 & 1 & 0 & 0 \\ 0 & 0 & 0 & 0 \\ 0 & 0 & 0 & 0 \\ 0 & 0 & 0 & 0 \end{pmatrix} x(t) + \begin{pmatrix} 0 \\ 1 \\ 0 \\ 0 \end{pmatrix} v(t) \quad (21a)$$

$$y(t) = \begin{pmatrix} 1 & 0 & 1 & 0 \\ 1 & 0 & 0 & v_x \frac{1}{L} \frac{2}{\frac{\omega_{rl}}{\omega_{rr}}+1} \frac{\omega_{rl}}{\omega_{rr}} \end{pmatrix} x(t) + e(t) \quad (21b)$$

It is here assumed that there is an unknown input v(t) that affects the yaw acceleration, which is a common model for motion models, basically motivated by Newton's law F=ma.

A discrete time state space model:

$$x(t+1) = \begin{pmatrix} 1 & T_s & 0 & 0 \\ 0 & 1 & 0 & 0 \\ 0 & 0 & 1 & 0 \\ 0 & 0 & 0 & 1 \end{pmatrix} x(t) + \begin{pmatrix} T_s^2/2 \\ T_s \\ 0 \\ 0 \end{pmatrix} v(t) \quad (22)$$

$$y(t) = \begin{pmatrix} 1 & 0 & 1 & 0 \\ 1 & 0 & 0 & v_x \frac{1}{L} \frac{2}{\frac{\omega_{rl}}{\omega_{rr}}+1} \frac{\omega_{rl}}{\omega_{rr}} \end{pmatrix} x(t) + e(t)$$

is derived and is used by the Kalman filter.

Embodiments of the invention integrating information from wheel speed signals and gyro are thus capable to give accurate yaw angle and yaw rate measurements where the gyro offset and relative tire radii differences are estimated and compensated for. As an alternative, or further support, to ABS, one or several lateral accelerometers can be used to support the yaw rate sensor with a further yaw rate dependent sensor signal.

Figure 4:
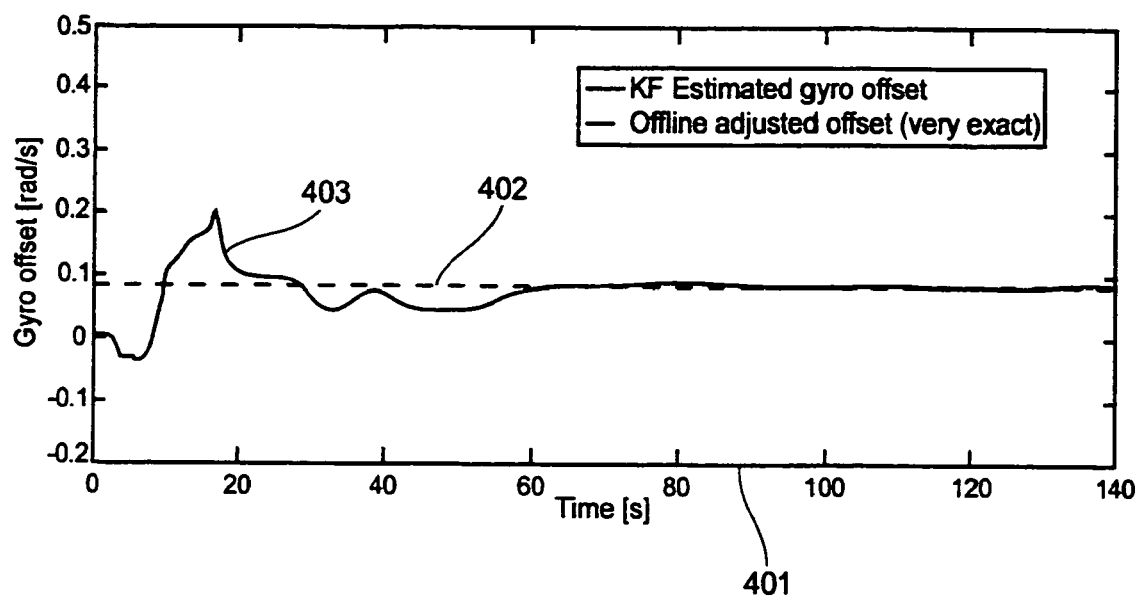
FIG. 4 shows a plot diagram of an estimated offset in accordance with the invention from an experimental test drive.

Simulations and experiments show that the accuracy in yaw rate, not regarding the offsets, is better than using any of the sensor types separately. FIG. 4 shows a plotted diagram 401 of a Kalman filter estimated gyro offset 403 compared with a very exact offline adjusted offset 402, the diagram having the time in seconds on the x-axis and gyro offset in rad/s on the y-axis. The diagram of FIG. 4 is a registration from an experimental test drive and shows that the Kalman filter estimation after a short transitional period converges with the offline adjusted offset within a margin of a few percentages of offset scale units.

A further advantage with the inventive concept is that the relative difference in wheel radii on non-driven right and left wheels can be very accurately estimated, which is advantageously used for tire pressure indication. In different embodiments the Kalman filter is used as a combined parameter estimator for the offset as well as a filter for yaw rate. In an alternative embodiment, an adaptive filter is used to estimate the offset parameters. A further effect of the invention is that it gives support for diagnosis of faults in gyro and accelerometer.

In a stepwise description of the embodiment for yaw rate estimation, the inventive method comprises the following steps:

(1) Collecting measurements from
   (a) a yaw rate gyro
   (b) ABS Sensors
   (c) possibly a lateral accelerometer
   (d) possibly wheel steering angle sensor (2) Preprocessing and filtering of raw sensordata
   1 Scaling of sensor inputs to physical constants yawrate=nom.scale_factor_gyro*rawinputgyro−nom.offset_gyro.

2 Low-pass filtering of yaw rate to reduce quantization and noise error effects for instance averaging over a few samples.
   3 Rotational synchronization of cog stamps to avoid cog deformity error effects i.e. calculate wheel angular velocity by using a full revolution of the wheel.
   4 Similar treatment of sensors (c) and (d) to reduce known error effects for instance low-pass filtering.
   5 Performing simple diagnosis on sensors to take care of sensor built-in diagnosis functions for instance sensors using a zero level voltage to indicate internal failure.

(3) Calculating filter inputs and parameters in error model
   1 Calculate the inverse curve radii estimate from front axle wheelage
   2 Calculate the inverse curve radii estimate from rear axle wheelage (with indices changed to wfl and wfr)
   3 Calculate the vehicle velocity estimate from ABS sensors
   4 Calculate the yaw rate estimate from front and rear wheelage
   5 Calculate the wheel radii offset error propagation function for rear axle
   6 Calculate the wheel radii offset error propagation function for front axle (4) Examine data quality by given norms to produce statistical matrices for Kalman Filtering, for instance:

---

[1] Low velocity increases noise and other errors in yaw rate from ABS sensors estimated
    if (velocity_estimate < LOW_LEVEL)
       Increase values in Kalman measurement covariance -continued

```
matrix R
    2 Standstill car assures yaw rate to be exactly zero
        if (velocity_estimate == ABSOLUTE_ZERO)
            Decrease values in Kalman measurement covariance
matrix R
```

(5) Applying the Kalman Filter equations
  1 Time update of Kalman Filter $x$hat=$F$*$x$hat;

$P$hat=$F$*$P$hat*$F'$+$G$*$Q$*$G'$;

2 Measurement update of Kalman Filter $K$=$P$hat*$H'$*inv($H$*$P$hat*$H'$+$R$);

$e$=$y$-$H$*$x$hat;

$x$hat=$x$hat+$K$*$e$;

$P$hat=$P$hat-$K$*$H$*$P$hat;

$P$hat=0.5*($P$hat+$P$hat');

Where xhat is the current state estimate and Phat is the current Kalman error covariance matrix, y is current measurement, H is measurement matrix, F is state space model update matrix and G is noise update matrix.

(6) Output of yaw rate and offset estimates
  1 Provide a fast yaw rate which is the current measured low-pass filtered yaw rate minus the estimated offset to be used by for instance time-critical control systems.
  2 Provide a filtered yaw rate which is the current yaw rate state estimate of the Kalman Filter to be used by for instance navigation systems.
  3 Provide relative wheel radii between left and right wheels on rear and front wheelage to be used for instance by tire pressure estimation systems.
  4 Provide the rate gyro offset estimate to be used in diagnosis functions.

Velocity Computation

One embodiment of the invention is concerned with applying the invention for velocity computation, or more generally expressed longitudinal motion computation based on standard sensors of a vehicle. In accordance with the invention, a sensor signal from an accelerometer ax is integrated with a wheel angular velocity signal ω for example from an ABS in a sensor signal integration unit 218. The sensor signal integration unit comprises as explained above, a filtering process, and outputs a computed velocity signal vx 220 and a computed acceleration signal ax 222. As described above, an accelerometer sensing acceleration in the horizontal plane is preferably combined with a vertical accelerometer for compensation for vertical motion. Since this embodiment uses an accelerometer as a complement to the wheel speed signals, the velocity can be computed after locking the wheels when braking.

The basic equations upon which the computation is based are similar to those described above in connection with the yaw rate computation. Therefore, only the sensor signals to be fused and their characteristics are shown here. Wheel angular speed signals ω are received from an ABS and are transformed to a scaled velocities at selected positions in the car. The first sensor signal from the ABS is described by:

$$y_1(t) = v_x(t)\frac{1 + k^{-1}\mu(t) + \delta}{r} + e_1(t) \quad (23)$$

wherein y1 is the angular velocity of a driving wheel;
  vx is the absolute velocity of the wheel;
  r is the wheel radius;
  k is the slip-slope;
  δ is the slip offset; and
  μ is the wheel momentum.
The offset $$\frac{1 + k^{-1}\mu(t) + \delta}{r} \quad (24)$$

is here multiplicative, which means that the relations are non linear and the extended Kalman filter must be used. The sensor is accurate at medium frequencies, at a time scale where the friction and tire characteristics k, δ are unchanged. The second sensor signal from an accelerometer in longitudinal direction $a_x$ is described by:

$$y_2(t) = \dot{v}_x(t) + b_2 + e_2(t). \quad (25)$$

Summing up to time t gives:

$$\overline{y}_2(t) = \sum_{k=0}^{t} y_2(t) = v_x(t) - v_x(0) + b_2 t + \overline{e}_2(t) \quad (26)$$

The offset scalings (1 and t) are linearly independent if the traction force=μ(t) does not increase linearly in time, so the offsets $b_2$, k, δ are observable. In this embodiment, offset and drift free velocity is computed from driven wheel speed and accelerometer with non-negligible offset for instance to be used in 4WD vehicles when free-rolling wheels are not available. It also has a fast response to longitudinal velocity changes during skid, i.e. spin or brake. Furthermore, the embodiment is advantageously used for diagnosis of accelerometer. The system estimates the slip slope in a friction model which is also used to estimate tire-road friction.

In a stepwise description of the embodiment for velocity computation the inventive method comprises the following steps:
(1) Collection of measurements from
  (a) a longitudinal accelerometer
  (b) ABS Sensors
  (c) possibly a yaw rate gyro
(2) Preprocessing and filtering of raw sensordata
  1 Scaling of sensor inputs to physical constants
  2 Low-pass filtering of longitudinal acceleration measurement to reduce quantization and noise error effects for instance averaging over a few samples.
  3 Rotational synchronization of cog stamps to avoid cog deformity error effects i.e. calculate wheel angular velocity by using a full revolution of the wheel.
  4 Perform simple diagnosis on sensors to take care of sensor built-in diagnosis functions for instance sensors using a zero level voltage to indicate internal failure.
(3) Calculation of filter inputs and parameters in error model
  1 Calculate the vehicle velocity estimate from ABS sensors (Page 8—Eq 11)

2 Calculate the parameters in the error model (Page 12—Eq 23)
3 Calculate current matrices for the extended Kalman Filter (F, G, H, Q)

(4) Examine data quality by given norms to produce statistical matrices for Kalman Filtering, for instance:

---

1 Low velocity increases noise in velocity measurement from ABS sensors
    if (velocity_estimate < LOW_LEVEL)
        Increase values in Kalman measurement covariance matrix R
2 Standstill car assures velocity to be exactly zero
    if (velocity_estimate == ABSOLUTE_ZERO)
        Decrease values in Kalman measurement covariance matrix R

---

(5) Applying the Kalman Filter equations for the extended Kalman Filter
  1 Time update of Kalman Filter $$xhat = F*xhat;$$

$$Phat = F*Phat*F' + G*Q*G';$$

2 Measurement update of Kalman Filter $$K = Phat*H'*\mathrm{inv}(H*Phat*H' + R);$$

$$e = y - H*xhat;$$

$$xhat = xhat + K*e;$$

$$Phat = Phat - K*H*Phat;$$

$$Phat = 0.5*(Phat + Phat');$$

Where xhat is the current state estimate and Phat is the current Kalman error covariance matrix, y is current measurement, H is measurement matrix, F is state space model update matrix and G is noise update matrix.

(6) Output of velocity and offset estimates
  1 Provide a velocity estimate for control systems and MMI.
  2 Provide wheel slips for 4WD vehicles
  3 Provide the accelerometer offset estimate to be used in diagnosis functions.

Fuel Level and Fuel Consumption Sensor

An embodiment of the invention is directed to computation of fuel level and fuel consumption. This embodiment is schematically shown in FIG. 2C and takes as an input a fuel volume signal 224 from the tank meter of the vehicle and a fuel injection signal 226 from the engine. The basic equations are again similar to those described above, however the sensor signals are modelled according to the following equations.

Firstly, the tank level measurement is:

$$y_1(t) = V(t) + b_1 + e_1(t) \qquad (27)$$

This type of sensor usually suffers from medium-frequency disturbances in the noise component e1(t), which is normally handled with a very slow low-pass filter. On the other hand, low-frequency accuracy in the time constant of one re-fuelling is good. The offset depends inter alia on manufacturing variations and temperature.

Secondly, a fuel injection signal tq or the like is transformed to a momentary fuel consumption signal described as:

$$y_2(t) = \dot{V}(t) + b_2 + e_2(t) \qquad (28)$$

This sensor is very good at high frequencies, basically since it measures derivatives.

Summing up to time t gives:

$$\overline{y}_2(t) = \sum_{k=0}^{t} y_2(t) = V(t) - V(0) + b_2 t + \overline{e}_2(t) \qquad (29)$$

The offset scalings 1 and t are linearly independent and therefore the offsets are observable.

This in effect virtual sensor has the advantages of fast response after re-fuelling, is an offset free monitor of momentary as well as average values of fuel consumption, and is suitable to use for diagnosis of faults in fuel pipes and engine efficiency.

In a stepwise description of the embodiment for fuel consumption, the inventive method comprises the following steps:

(1) Collection of measurements from
  (a) a tank level measurement device
  (b) fuel injection signal
(2) Preprocessing and filtering of raw sensordata
  1 Scaling of sensor inputs to physical constants
  2 Low-pass filtering of fuel injection measurement to reduce quantization and noise error effects for instance averaging over a few samples.
  3 Perform simple diagnosis on sensors to take care of sensor built-in diagnosis functions for instance sensors using a zero level voltage to indicate internal failure.
(3) Calculation of filter inputs and parameters in error model
  1 Calculate the tank fuel level estimate from fuel level sensor
  2 Calculate the fuel consumption from fuel injection signal
(4) Examine data quality by given norms to produce statistical matrices for Kalman Filtering, for instance:
  1 High load on engine gives unreliable consumption results, increase part of R
(5) Applying the Kalman Filter equations
  1 Time update of Kalman Filter $$xhat = F*xhat;$$

$$Phat = F*Phat*F' + G*Q*G';$$

2 Measurement update of Kalman Filter $$K = Phat*H'*\mathrm{inv}(H*Phat*H' + R);$$

$$e = y - H*xhat;$$

$$xhat = xhat + K*e;$$

$$Phat = Phat - K*H*Phat;$$

$$Phat = 0.5*(Phat + Phat');$$

Where xhat is the current state estimate and Phat is the current Kalman error covariance matrix, y is current measurement, H is measurement matrix, F is state space model update matrix and G is noise update matrix.

(6) Output of fuel level fuel consumption and offset estimates
  1 Provide fuel level for MMI systems.
  2 Provide fuel consumption level for control systems and MMI systems Virtual Sensor for an Absolute Velocity Indicator One embodiment of the invention is applied in velocity computation, or more generally expressed longitudinal motion computation based on standard sensors of a vehicle. In accordance with a variety of this embodiment, a sensor signal from an accelerometer $a_x$ is integrated with a wheel angular velocity signal ω (for example from an ABS unit) in a sensor signal integration unit. The sensor signal integration unit comprises, as explained above, a filtering process, and outputs a computed velocity signal $v_x$ and a computed acceleration signal $a_x$. As described above, an accelerometer sensing acceleration in the horizontal plane is preferably combined with a vertical accelerometer for compensation for vertical motion. Since this embodiment uses an accelerometer as a complement to the wheel speed signals, the velocity can be computed also after locking the wheels when braking.

Wheel angular speed signals ω are received from an ABS and are transformed to scaled velocities at selected positions in the car. The first sensor signal from the ABS is described by $$y_1(t) = v_x(t)\frac{1 + k^{-1}\mu(t) + \delta}{r} + e_1(t) \tag{30}$$

where $y_1$ is the angular velocity of a driving wheel, $v_x$ is the absolute velocity of the wheel, r is the wheel radius, k is the longitudinal stiffness, δ is the slip offset, μ is the normalized traction force, and $e_1$ is measurement noise.

The offset $$\frac{1 + k^{-1}\mu(t) + \delta}{r}$$

(31) is here multiplicative, which means that the relations are non-linear and a non-linear observer or the extended Kalman filter must be used. The sensor is accurate at medium frequencies, at a time scale where the friction and tire characteristics, k and δ are unchanged.

The second sensor signal from an accelerometer in longitudinal direction $a_x$ is described by $$y_2(t) = \dot{v}_x(t) + b_2 + e_2(t).$$

Summing up this equation to time t gives $$\overline{y}_2(t) = \sum_{k=0}^{t} y_2(t) = v_x(t) - v_x(0) + b_2 t + \overline{e}_2(t) \tag{33}$$

The offset scalings (1 and t) are linearly independent if the normalized traction force μ(t) does not increase linearly in time, so the offsets $b_2$, k, δ are observable.

In this embodiment, offset and drift free velocity is computed from driven wheel speed and accelerometer with non-negligible offset for instance to be used in 4WD vehicles when free-rolling wheels are not available. It also has a fast response to longitudinal velocity changes during skid, i.e. spin or brake. Furthermore, the embodiment is advantageously used for diagnosis of the accelerometer. The system estimates the slip slope in a friction model which is also used to estimate tire-road friction.

In a stepwise description of the embodiment for velocity computation, the inventive method comprises the following steps:
(1) Collection of measurements from:
  (a) a longitudinal accelerometer
  (b) ABS Sensors
  (c) possibly a yaw rate gyro
(2) Preprocessing and filtering of raw sensordata:
  Scaling of sensor inputs to physical constants
  Low-pass filtering of longitudinal acceleration measurement to reduce quantization and noise error effects for instance averaging over a few samples.
  Rotational synchronization of cog stamps to avoid cog deformity error effects, i.e., calculate wheel angular velocity by using a full revolution of the wheel.
  Perform simple diagnosis on sensors to take care of sensor built-in diagnosis functions for instance sensors using a zero level voltage to indicate internal failure.
(3) Calculation of filter inputs and parameters in error model:
  Calculate the vehicle velocity estimate from ABS sensors
  Calculate the parameters in the error model
  Calculate current matrices for the extended Kalman Filter (F, G, H, Q)
(4) Examine data quality by given norms to produce statistical matrices for Kalman Filtering, for instance:
  Low velocity increases noise in velocity measurement from ABS sensors
    if (velocity_estimate<LOW_LEVEL)
    Increase values in Kalman measurement covariance matrix R
  Standstill car assures velocity to be exactly zero
    if (velocity_estimate==ABSOLUTE_ZERO)
    Decrease values in Kalman measurement covariance matrix R
(5) Applying the Kalman filter equations for the extended Kalman filter:
  (a) Time update $$\hat{x}_k = F_k \hat{x}_{k-1}$$

$$P_k = F_k P_{k-1} F_k^T + G_k Q_k G_k^T \tag{33}$$

(b) Measurement update $$K = P_k H_k^T (H_k P_k H_k^T + R_k)^{-1}$$

$$\epsilon_k = y_k - H_k \hat{x}_k$$

$$\hat{x}_k = \hat{x}_k + K \epsilon_k$$

$$P_k = P_k - K H_k P_k^T \tag{34}$$

Where $\hat{x}_k$ is the current state estimate, $P_k$ is the current state error covariance matrix, and $y_k$ is current measurement. The state space matrices $F_k$, $G_k$ and $H_k$ are obtained by linearizing the non-linear state space model around the current state estimate $\hat{x}_k$. The results and uses of velocity and offset estimates in accordance with this embodiment are for example to provide a velocity estimate for control systems and MMI (man machine interface), to provide wheel slip indications or estimates for 4WD vehicles, and to provide an accelerometer offset estimate to be used in diagnosis functions.

Sensor for a Roll Angel Indicator

An embodiment of the invention being applicable for a virtual sensor as well as for an autocalibrating sensor is directed to achieve a roll angle indicator. By way of example, the described embodiment uses a lateral and a vertical accelerometer, a yaw rate gyro and a velocity estimate. The measurement from the lateral accelerometer is denoted $a_y$ and from the vertical accelerometer $a_z$. The required velocity is in this example provided by the ABS by rescaling the angular velocity with the wheel radius.

A common problem with accelerometers is a temperature dependent sensor offset. This invention provides an alternative to the costly solution of calibrating all sensors during production also entailing that an additional temperature sensor is required on each motorcycle. An embodiment of the invention is adapted to estimate and compensate for the sensor offsets automatically during driving.

Accelerometers and gyros typically deliver a continuous time signal. In order to use this signal in a discrete time system this signal must be sampled using a suitable sampling rate. Alias effects are avoided by using an anti alias filter (LP-filter) before the sampling. Outliers deteriorates the performance of the system and are removed before the sensor fusion stage. The sensor fusion is performed using an adaptive filter, preferably a Kalman filter.

Figure 5:
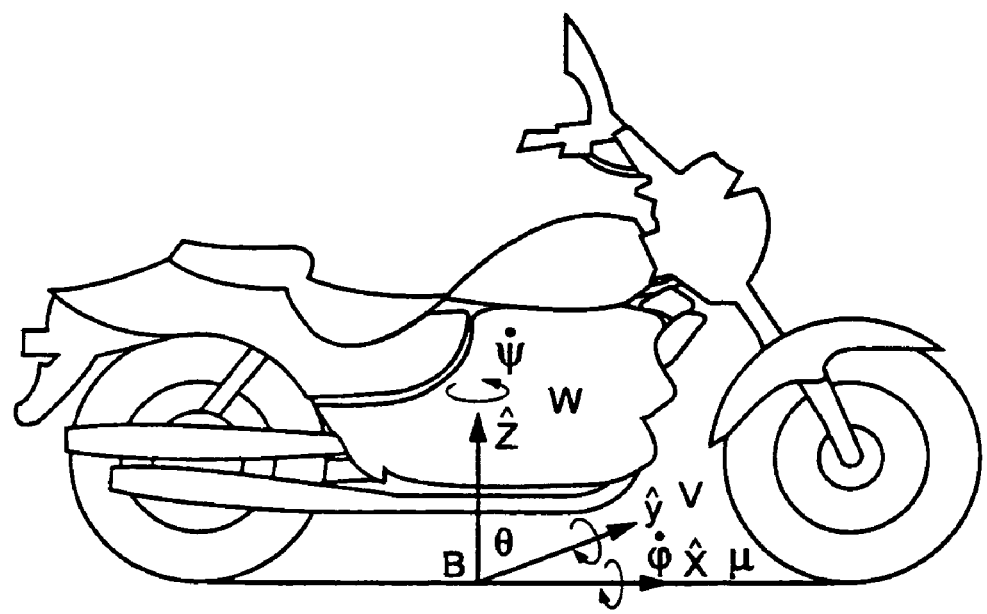
FIGS. 5A and 5B show coordinate systems and sensor configuration in a motorcycle.
Figure 5:
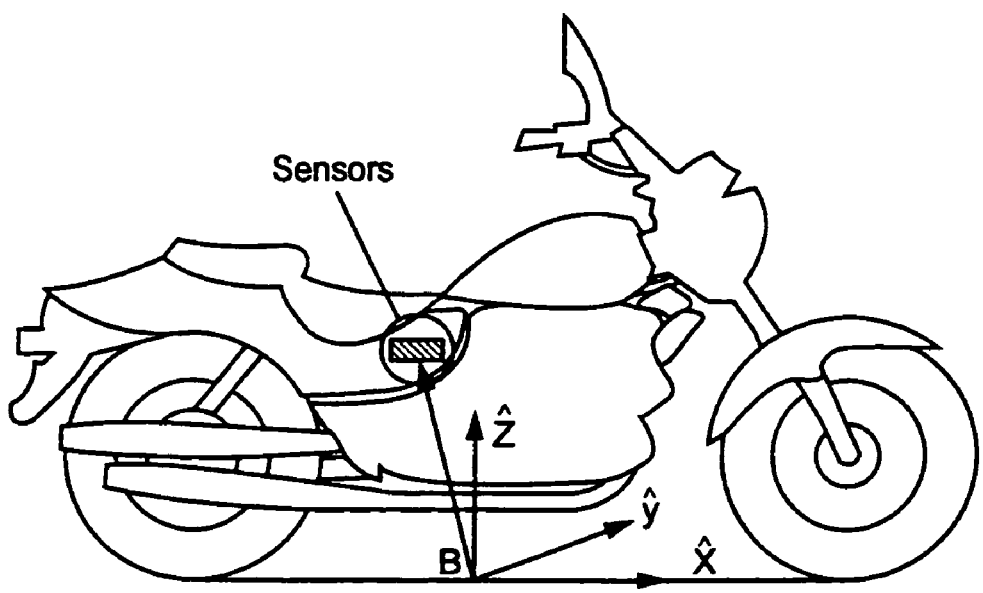

Models describing the accelerometers are derived using mechanical engineeringe. The general expressions for an ideal lateral and an ideal vertical accelerometer moving in a field of gravity are:

$$a_{By} = \dot{v} + u\dot{\psi} - w\dot{\phi} + x\ddot{\psi} - z\ddot{\phi} + x\dot{\phi}\dot{\theta} - y(\dot{\phi}^2 + \dot{\psi}^2) + z\dot{\theta}\dot{\psi} + g \sin \Phi \cos \Theta$$

$$a_{Bz} = \dot{w} + v\dot{\phi} - u\dot{\theta} + y\ddot{\phi} - x\ddot{\theta} + x\dot{\phi}\dot{\psi} + y\dot{\theta}\dot{\psi} - z(\dot{\phi}^2 + \dot{\theta}^2) + g \cos \Phi \cos \Theta \quad (35)$$

with notation for a motorcycle in accordance with the illustration of coordinate systems in FIG. 5A, the sensor configuration in FIG. 5B and according to the following.

| Symbol | Meaning |
| --- | --- |
| u | Longitudinal velocity |
| $\dot{u}$ | Longitudinal acceleration |
| v | Lateral velocity |
| $\dot{v}$ | Lateral acceleration |
| w | Vertical velocity |
| $\dot{w}$ | Vertical acceleration |
| $\Phi$ | Roll angle |
| $\dot{\psi}$ | Angular velocity around local axle $\hat{x}$ |
| $\ddot{\psi}$ | Angular acceleration around local axle $\hat{x}$ |
| $\Theta$ | Pitch angle |
| $\dot{\theta}$ | Angular velocity around local axle $\hat{y}$ |
| $\ddot{\theta}$ | Angular acceleration around local axle $\hat{y}$ |
| $\dot{\psi}$ | Angular velocity around local axle $\hat{z}$ |
| $\ddot{\psi}$ | Angular acceleration around local axle $\hat{z}$ |
| x | Position of sensor in coordinate axle $\hat{x}$ |
| y | Position of sensor in coordinate axle $\hat{y}$ |
| z | Position of sensor in coordinate axle $\hat{z}$ |
| g | Gravity (g ≈ 9.81 [m/s²]) |

For a motorcycle is the lateral velocity v and vertical velocity w approximately zero during normal driving. The expressions are further simplified if the location of the accelerometers are chosen to x=0, y=0 and z=$z_x$.

The sensor models are simplified to $$a_{By} = u\dot{\psi} - z_x\ddot{\phi} + z_x\dot{\theta}\dot{\psi} + g \sin \Phi \cos \Theta$$

$$a_{Bz} = -u\dot{\theta} - z_x(\dot{\phi}^2 + \dot{\theta}^2) + g \cos \Phi \cos \Theta \quad (36)$$

If $\Theta$ is assumed to be constant equal to zero are $$\begin{cases} \dot{\theta} = \dot{\psi} \tan \Phi \\ \dot{\Phi} = \dot{\varphi} \end{cases}$$

It is now obvious that the local roll rate $\dot{\phi}$ is equal to the global roll rate $\dot{\Phi}$ and also that $\dot{\theta}$ can be eliminated from the accelerometer models.

$$a_{By} = u\dot{\psi} - z_x(\ddot{\phi} + \dot{\psi}^2 \tan \Phi) + g \sin \Phi$$

$$a_{Bz} = -u\dot{\psi} \tan \Phi - z_x(\dot{\phi}^2 + \dot{\psi}^2 \tan^2 \Phi) + g \cos \Phi$$

The first term in the expressions, $u\dot{\psi}$ or $u\dot{\psi} \tan \Phi$, is important for modelling high velocity turns. The increased normal force on the motorcycle from the ground is explained by this term. The second term depends on the location of the sensor in $\hat{z}$ and the third is the influence from gravity. Unfortunately there are two allowed solutions to these two expressions. In order to improve the system is one more interpretation of the lateral measurement required. This interpretation is made using necessary conditions to achieve state of equilibrium in steady state turning.

Using Newtons equations is the following expression derived $$g \cos \Theta \sin \Phi_G = -\frac{u\dot{\psi}}{mz_\tau}\left(\frac{I_f}{r_f} + \frac{I_r}{r_r}\right) - u\dot{\psi} + \alpha_1' \ddot{\varphi} + \alpha_2' \dot{\theta}\dot{\psi}$$

| Symbol | Meaning |
| --- | --- |
| m | Total mass, driver + motorcycle + load |
| $I_f$ | Moment of inertia front wheel |
| $I_r$ | Moment of inertia rear wheel |
| $r_f$ | Wheel radius front wheel |
| $r_r$ | Wheel radius rear wheel |
| $\alpha_1'$ | Parameter dependent on MC geometry |
| $\alpha_2'$ | Parameter dependent on MC geometry |
| $z_\tau$ | Distance ground to center of mass |
| $\Theta$ | Tilt |
| $\Phi_G$ | Roll angle to the CoM driver + MC |

Introduce the parameter $$K = \frac{1}{m}\left(\frac{I_f}{z_{f\tau}r_f} + \frac{I_r}{z_{r\tau}r_r}\right)$$

which describes the physical properties of the particular type of motorcycle. Assuming $\Phi_G = \Phi$ results in $$g \cos \Theta \sin \Phi = -u\dot{\psi}K - u\dot{\psi} + \alpha_1' \ddot{\varphi} + \alpha_2' \dot{\theta}\dot{\psi}$$

Assume constant pitch angle $\dot{\Theta} = 0$ and use $\dot{\theta} = \dot{\psi} \tan \Phi$ $$g \cos \Theta \sin \Phi = -u\dot{\psi}K - u\dot{\psi} + \alpha_1' \ddot{\varphi} + \alpha_2' \dot{\psi}^2 \tan \Phi$$

Inserting this expression in the earlier derived expression for the lateral accelerometer yields $$a_{By} = \alpha_1 \ddot{\phi} + \alpha_2 \dot{\psi}^2 \tan \Phi - u\dot{\psi} K$$

where the new variables $\alpha_1$ and $\alpha_2$ are constants describing the geometry of the motorcycle but are not equal to $\alpha_1'$ and $\alpha_2'$.

There are now one model for the vertical and two models for the lateral accelerometer available.

$$a_{By} = u\dot{\psi} - z_x\ddot{\phi} + z_x\dot{\psi}^2 \tan \Phi + g \sin \Phi$$

$$a_{Bz} = -u\dot{\psi} \tan \Phi - z_x(\dot{\phi}^2 + \dot{\psi}^2 \tan^2 \Phi) + g \cos \Phi$$

$$a_{By} = \alpha_1 \ddot{\phi} + \alpha_2 \dot{\psi}^2 \tan \Phi - u\dot{\psi} K$$

A rate gyro model follows from that the rate gyro is attached in the longitudinal direction $\hat{x}$ and measures ideally the roll angle derivative or gyro=$\dot{\phi}$. There are now one sensor model for the ideal vertical accelerometer, two models for the ideal lateral accelermoter and one model for the ideal rate gyro. An improved model is achieved if the model is extended with additive sensor offsets:

$$a_{By} = u\dot{\psi} - z_x\ddot{\phi} + z_x\dot{\psi}^2 \tan \Phi + g \sin \Phi + \delta_y$$

$$a_{Bz} = -u\dot{\psi} \tan \Phi - z_x(\dot{\phi}^2 + \dot{\psi}^2 \tan^2 \Phi) + g \cos \Phi + \delta_z$$

$$a_{By} = \alpha_1 \ddot{\phi} + \alpha_2 \dot{\psi}^2 \tan \Phi - u\dot{\psi} K + \delta_y$$

$$\text{gyro} = \dot{\phi} + \delta_{gyro}$$

where the notation is as presented earlier and

| Notation | Meaning |
| --- | --- |
| $\delta_y$ | Sensor offset lateral accelerometer |
| $\delta_z$ | Sensor offset vertical accelerometer |
| $\delta_{gyro}$ | Sensor offset gyro |

The adaptive filter is in this embodiment implemented by means of an extended Kalman filter. A continuous time state space model is derived and is then transformed to a discrete time state space model using per se known theory from linear systems and sampled systems. The continuous time state space model for the system is $$\dot{x} = Ax + Bw$$

$$z = h(x) + v$$

The state vector x consists of seven elements $x = (x_1\ x_2\ x_3\ x_4\ x_5\ x_6\ x_7)^T$, wherein:

$x_1 = \phi$ = Rotation around $\hat{x}$ $x_2 = \dot{\phi}$ = Angular velocity around $\hat{x}$ $x_3 = \ddot{\phi}$ = Angular acceleration around $\hat{x}$ $x_4 = \dot{\psi}$ = Angular velocity around $\hat{z}$ $x_5 = \delta_y$ = Accelerometer offset lateral accelerometer $x_6 = \delta_z$ = Accelerometer offset vertical accelerometer $x_7 = \delta_{gyro}$ = Gyro offset.

$$\dot{x}(t) = \underbrace{\begin{pmatrix} 1 & 0 & 0 & 0 & 0 & 0 & 0 \\ 0 & 1 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix}}_{A} x(t) + \underbrace{\begin{pmatrix} 0 & 0 & 0 & 0 & 0 \\ 0 & 0 & 0 & 0 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}}_{B} w(t)$$

$$z(t) = \underbrace{\begin{pmatrix} u(t)x_4 - z_s x_3 + z_s x_4^2 \tan x_1 + g\sin x_1 + x_5 \\ -u(t)x_4 \tan x_1 - z_s(x_2^2 + x_4^2 \tan^2 x_1) + g\cos x_1 + x_6 \\ \alpha_1 x_3 + \alpha_2 x_4^2 \tan x_1 - u(t)x_4 K + x_5 \\ x_2 + x_7 \end{pmatrix}}_{h(x(t))} + v(t)$$

The discrete time Kalman filter is written $$x_{k+1} = Fx_k + Gw_k$$

$$z_k = h(x_k) + v_k$$

Where T is the sampling time. Derivation of F and G from A and B is straightforward according to the theory for sampled systems.

$$x_{k+1} = \underbrace{\begin{pmatrix} 1 & T & T^2/2 & 0 & 0 & 0 & 0 \\ 0 & 1 & T & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix}}_{F} x_k + \underbrace{\begin{pmatrix} T^3/6 & 0 & 0 & 0 & 0 \\ T^2/2 & 0 & 0 & 0 & 0 \\ T & 0 & 0 & 0 & 0 \\ 0 & T & 0 & 0 & 0 \\ 0 & 0 & T & 0 & 0 \\ 0 & 0 & 0 & T & 0 \\ 0 & 0 & 0 & 0 & T \end{pmatrix}}_{G} w_k$$

$$z_k = \underbrace{\begin{pmatrix} u_k x_4 - z_s x_3 + z_s x_4^2 \tan x_1 + g\sin x_1 + x_5 \\ -u_k x_4 \tan x_1 - z_s(x_2^2 + x_4^2 \tan^2 x_1) + g\cos x_1 + x_6 \\ \alpha_1 x_3 + \alpha_2 x_4^2 \tan x_1 - u_k x_4 K + x_5 \\ x_2 + x_7 \end{pmatrix}}_{h(x(t))} + v_k$$

Writing the discrete time signal model z=h(x), the extended Kalman filter is applied as follows.

$$x_{k+1} = f(x_k) + g(x_k)w_k,$$

$$z_k = h(x_k) + v_k$$

Here f, g and h are nonlinear functions of the states $x_k$. Define the matrices F, G and H according to:

$$F_k = \frac{\partial f_k(x)}{\partial x}\bigg|_{x=\hat{x}_{k/k}}$$

$$H_k' = \frac{\partial h_k(x)}{\partial x}\bigg|_{x=\hat{x}_{k/k-1}}$$

$$G_k = g_k(\hat{x}_{k/k})$$

The linearized signal model be written as $$x_{k+1} = F_k x_k + G_k w_k + u_k$$

$$z_k = H_k' x_k + v_k + y_k$$

where $$u_k = f_k(\hat{x}_{k/k}) - F_k \hat{x}_{k/k}$$

$$y_k = h_k(\hat{x}_{k/k-1}) - H_k' \hat{x}_{k/k-1}$$

and $$E[w_k w_l'] = Q \delta_{k1}$$

$$E[v_k v_l'] = R \delta_{k1}$$

The extended Kalman filter equations are then $$\hat{x}_{k/k} = \hat{x}_{k/k-1} + L_k[z_k - h_k(\hat{x}_{k/k-1})]$$

$$\hat{x}_{k+1/k} = f_k(\hat{x}_{k/k})$$

$$L_k = \Sigma_{k/k-1} H_k \Omega_k^{-1}$$

$$\Omega_k = H_k \Sigma_{k/k-1} H_k + R_k$$

$$\Sigma_{k/k} = \Sigma_{k/k-1} - \Sigma_{k/k-1} H_k [H_k' \Sigma_{k/k-1} H_k + R_k]^{-1} H_k' \Sigma_{k/k-1}$$

$$\Sigma_{k+1/k} = F_k \Sigma_{k/k} F_k' + G_k Q_k G_k'$$

Initialisation is provided by: $\Sigma_{0/-1} = P_0, x_{0/-1} = \hat{x}_0$.

The necessary matrices for the roll angle estimation problem using two accelerometers the velocity of the motorcycle and an extended Kalman filter are:

$$F_k = \left. \frac{\partial f_k(x)}{\partial x} \right|_{x=\hat{x}_{k/k}} = \begin{pmatrix} 1 & T & T^2/2 & 0 & 0 & 0 & 0 \\ 0 & 1 & T & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix} = F$$

$$G_k = g_k(\hat{x}_{k/k}) = \begin{pmatrix} T^3/6 & 0 & 0 & 0 & 0 \\ T^2/2 & 0 & 0 & 0 & 0 \\ T & 0 & 0 & 0 & 0 \\ 0 & T & 0 & 0 & 0 \\ 0 & 0 & T & 0 & 0 \\ 0 & 0 & 0 & T & 0 \\ 0 & 0 & 0 & 0 & T \end{pmatrix}$$

$$H_k' = \left. \frac{\partial h_k(x)}{\partial x} \right|_{x=\hat{x}_{k-1}} =$$

$$\begin{pmatrix} z_s x_4^2(1+\tan^2 x_1) + g\cos x_1 & 0 & -z_s & u_k + 2z_s x_4 \tan x_1 & 1 & 0 & 0 \\ -u_k x_4(1+\tan^2 x_1) - 2z_s x_4^2 \tan x_1(1+\tan^2 x_1) - \sin x_1 & -2z_s x_2 & 0 & -u \tan x_1 - 2z_s x_4 \tan^2 x_1 & 0 & 1 & 0 \\ \alpha_2 x_4^2(1+\tan^2 x_1) & 0 & \alpha_1 & 2\alpha_2 x_4 \tan x_1 - uK & 1 & 0 & 0 \\ 0 & 1 & 0 & 0 & 0 & 0 & 1 \end{pmatrix}$$

All that remains in order to run the algorithm is the initialization. $\hat{x}_0$ is chosen to suitable values and the matrix $P_0$ reflects the uncertainty of $\hat{x}_0$. One choice is $$\hat{x}_0 = (0\ 0\ 0\ 0\ 0\ 0\ 0)^T$$

$$P_0 = \begin{pmatrix} 0.05 & 0 & 0 & 0 & 0 & 0 & 0 \\ 0 & 0.01 & 0 & 0 & 0 & 0 & 0 \\ 0 & 0 & 0.01 & 0 & 0 & 0 & 0 \\ 0 & 0 & 0 & 0.01 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix}$$

Figure 6:
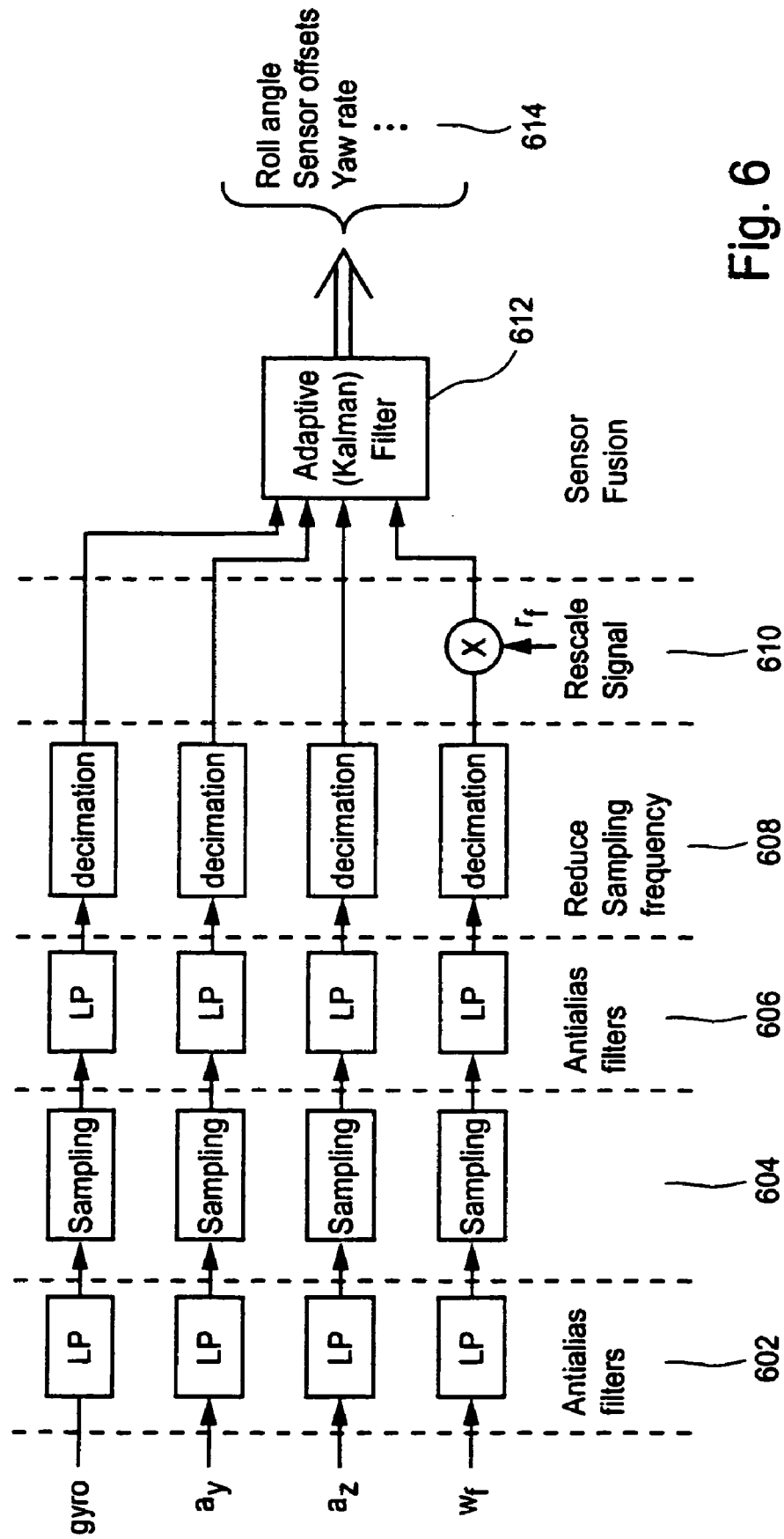
FIG. 6 shows an embodiment of a virtual sensor for a roll angle indicator in a motorcycle.

The described mathematical expressions are employed for example in a virtual sensor as shown in FIG. 6, taking as an input a selection of yaw signal from gyro, lateral acceleration signal ay, vertical acceleration signal az and wheel angular velocity signal ωf. The sensor signals are preferably preprocessed by being low pass filtered in stage 602, sampled in stage 604 low pass filtered in stage 606 and data reduced in stage 608. The angular velocity signal is preferably also rescaled in stage 610. The thus preprocessed sensor signals are the input into an adaptive filter 612 based on a model in accordance with the previous description. The output of the filter are values or signals for a roll angle, sensor offsets and yaw rate.

Virtual Sensor for Fuel Level and Fuel Consumption

One embodiment of the invention is directed to computation of fuel level and fuel consumption. This embodiment takes as an input a fuel volume signal from the tank meter of the vehicle, and a fuel injection signal from the engine. The basic equations are again similar to those described in earlier sections, however the sensor signals are modelled according to the following equations.

Firstly, the tank level measurement is:

$$y_1(t) = V(t) + b_1 + e_1(t)$$

This type of sensor usually suffers from medium frequency disturbances in the noise component $e_1$ which is normally handled with a very slow low-pass filter. On the other hand, low-frequency accuracy in the time constant of one re-fuelling is good. The offset depends inter alia on manufacturing variations and temperature.

Secondly, a fuel injection signal tq or the like is transformed to a momentary fuel consumption signal described as $$y_2(t) = \dot{V}(t) + b_2 + e_2(t)$$

This sensor is very good at high frequencies, basically since it measures derivatives. Summing up $y_2$ to time t gives:

$$\bar{y}_2(t) = \sum_{k=0}^{t} y_2(t) = V(t) - V(0) + b_2 t + \bar{e}_2(t)$$

The offset scalings 1 and t are linearly independent and therefore the offsets are observable.

This in effect virtual sensor has the advantages of fast response after re-fuelling, is an offset free monitor of momentary as well as average values of fuel consumption, and is suitable to use for diagnosis of faults in fuel pipes and engine efficiency.

In a stepwise description of the embodiment for fuel consumption, the inventive method comprises the following steps:
1. Collection of measurements from:
   (a) a tank level measurement device;
   (b) a fuel injection signal
2. Preprocessing and filtering of raw sensor data:
   (a) Scaling of sensor inputs to physical constants
   (b) Low-pass filtering of fuel injection measurement to reduce quantization and noise error effects for instance averaging over a few samples.
   (c) Perform simple diagnosis on sensors to take care of sensor built-in diagnosis functions for instance sensors using a zero level voltage to indicate internal failure.
3. Calculation of filter inputs and parameters in error model:
   (a) Calculate the tank fuel level estimate from fuel level sensor
   (b) Calculate the fuel consumption from fuel injection signal
4. Examine data quality by given norms to produce statistical matrices for Kalman Filtering, for instance:
   (a) High load on engine gives unreliable consumption results, increase part of R
5. Applying the Kalman Filter equations
   (a) Time update of Kalman Filter $$\hat{x} = F_k \hat{x}_{k-1}$$

$$P_k = F_k P_{k-1} F_k^T + G_k Q_k G_k^T$$

(b) Measurement update of Kalman Filter $$K = P_k H_k^T (H_k P_k H_k^T + R_k)^{-1}$$

$$\epsilon_k = y_k - H_k \hat{x}_k$$

$$\hat{x}_k = \hat{x}_k + K \epsilon_k$$

$$P_k = P_k - K H_k P_k^T$$

where $\hat{x}_k$ is the. The state space matrices $F_k$, $G_k$ and $H_k$ are obtained by linearizing the non current state estimate, $P_k$ is the current state error covariance matrix, and $y_k$ is the current measurement—linear state space model around the current state estimate $\hat{x}_k$.

Figure 7:
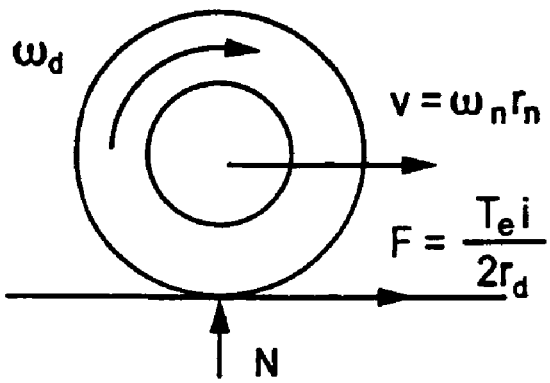
FIG. 7 shows wheel geometry.

6. Output of fuel level fuel consumption and offset estimates
   (a) Provide fuel level for MMI systems.
   (b) Provide fuel consumption level for control systems and MMI systems Virtual Sensor for Aqua Planning Detection One embodiment of the invention is directed to automatic aqua planning detection (APD) based on the following principles. The measured signals and computed quantities that are utilized by the virtual sensor APD are summarized shown in FIG. 7 and the following table.

| Symbol | Description |
| --- | --- |
| $\omega_d$ | Angular velocity, driven wheel [rad/s] |
| $\omega_n$ | Angular velocity, non-driven wheel [rad/s] |
| $r_d$ | Wheel radius, driven wheel [m] |
| $r_n$ | Wheel radius, non-driven wheel [m] |
| $T_e$ | Engine torque [Nm] |
| i | Gearing ratio from engine to driven wheels [−] |
| N | Normal force at driven wheel [N] |
| s | Wheel slip [−] |
| μ | Normalized traction force [−] |

Figure 8:
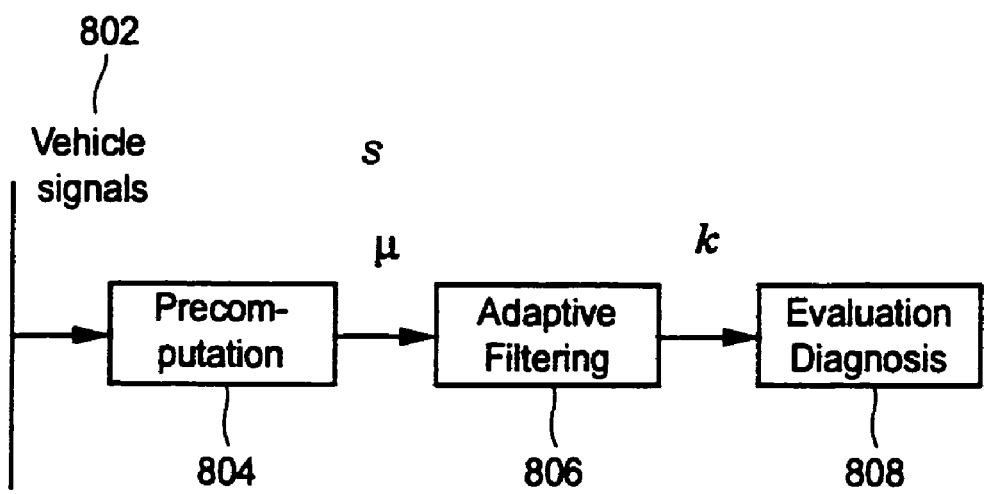
FIG. 8 shows a schematic block diagram of a virtual sensor for an aqua planning detector in accordance with an embodiment of the invention.

FIG. 8 shows a schematic view of the functional components in a variety of this embodiment, viz vehicle signals 802 are input into a precomputation or preprocessing stage 804. The precomputed output is the filtered in an adaptive filtering process stage 806 in accordance with the inventive concept producing output parameter signals that are subject to evaluation or used in a diagnosis in stage 808.

The virtual sensor APD detects aqua planning by monitoring the longitudinal stiffness k, which during normal driving conditions can be modeled as $$k = \frac{\mu}{s},$$

where $$\mu = \frac{T_e i}{2 r_d N}$$

is the normalized traction force and $$s = \frac{\omega_d r_d - \omega_n r_n}{\omega_n r_n} = \frac{\omega_d r_d}{\omega_n r_n} - 1$$

is the wheel slip. Here N is the tire normal force that depends on the mass, the vehicle geometry and the vehicle state (such as the current velocity and acceleration/retardation). In case of aqua planning, the lack of friction between the tire and the road gives rise to an increased wheel slip s if the traction force μ is maintained. Therefore, it is possible to detect aqua planning by monitoring sudden decreases in the estimated slope parameter k. In practice it is necessary to take into account that the wheel radii $r_d$ and $r_n$ are unknown. By introducing $\delta$ as the relative difference in wheel radii, i.e., $$\delta = \frac{r_n - r_d}{r_n},$$

and approximating the wheel slip as $$\delta = \frac{r_n - r_d}{r_n},$$

and approximating the wheel slip as $$s_m = \frac{\omega_d}{\omega_n} - 1,$$

obtains the model $$s_m \approx s + \delta = \frac{1}{k}\mu + \delta.$$

The parameters in this model, $1/k$ and $\delta$, are estimated from measured slip $s_m$ and traction force $\mu$ using an adaptive filter, such as a recursive least squares algorithm or a Kalman filter and the state space model $$x_{t+1} = x_t + w_t,$$

$$s_{m,t} = H_1 x_t + e_t,$$

where $x_1 = (1/k\ \delta)^T$, $H_1 = (\mu,\ 1)^T$, and $w_t$ and $e_t$ are process and measurement noise respectively.

The invention has been described by means of exemplifying embodiments for different applications and it should be appreciated that several designs are possible within the inventive concept and as defined in the claims.

The invention claimed is:

1. A method of calculating a physical parameter value (X) of a wheeled vehicle indirectly using at least two directly measurable input signals, comprising the steps of:
   (a) receiving a first input sensor signal (y1(t)) that is dependent on a first physical input parameter affecting a condition of the wheeled vehicle;
   (b) receiving a second input sensor signal (y2(t)) that is dependent on a second physical input parameter affecting a condition of the wheeled vehicle, wherein the second physical input parameter can be any one of the same as physical parameter value (X), the same as the first physical input parameter, and different from the first physical input parameter;
   (c) recursively filtering the first and second physical input parameters by means of an adaptive filter based on a predetermined model of the condition of the wheeled vehicle, wherein the input signals to said model include the first physical input parameter (y1(t)), the second physical input parameter (y2(t)), a first offset scaling factor (c1(t)) for the first sensor signal, and a second offset scaling factor (c2(t)) for the second sensor signal, and wherein the model output signals include a first offset error signal (b1(t)) and a second offset error signal (b2(t)), and the physical parameter value (X);
   (d) estimating the values of said first offset error (b1(t)) and the second offset error (b2(t)) by means of said adaptive filter, wherein at least one offset error relates to the wheel radius; and
   (e) calculating the physical parameter value (X) using the adaptive filter from the input sensor signals y1(t) and y2(t) such that offset errors in the calculation are compensated for by means of the first and second offset error parameters (b1(t)) and (b2(t)) and the offset scaling factors c1(t) and c2(t).

2. The method of claim 1, wherein the model is based on relations between measured values (y(t)) of said physical parameter (x(t)) and offsets (b1,b2) for said first and second sensor signals corresponding to the algebraic expression $$y1(t) = x(t) + c1(t)b1$$

$$y2(t) = x(t) + c2(t)b2,$$

where y1(t) is a measurement of said physical parameter x(t) detected by means of a first sensor and represented by said first sensor signal having said first offset error b1 and a first offset scaling c1(t) according to a predetermined function of time; and where y2(t) is a measurement of said physical parameter x(t) detected by means of a second sensor and represented by said second sensor signal having said second offset error b2 and a second offset scaling c2(t) according to a predetermined function of time.

3. The method of claim 1, wherein the model is based on relations between measured values (yi(t)) of said physical parameter (x(t)) and offsets (bi(t)) for a number i of sensor signals corresponding to the algebraic expression $$yi(t) = x(t) + ci(t)bi(t),$$

where yi(t) is a measurement of said physical parameter X(t) detected by means of a sensor number i and represented by a sensor signal having an offset error bi and an offset scaling ci(t) according to a predetermined function of time.

4. The method of claim 1, further comprising the steps:
evaluating the observability of said physical parameter; and
updating offset measurements if a predetermined observability criterion met.

5. The method of claim 4, further comprising the step of using external information in the observability evaluation.

6. The method of claim 4, further comprising the steps of:
initializing the sensor and filter system;
receiving as an input the next measurement or sample of said sensor signals;
checking the observability of said physical parameter;
if observability is met, then updating offset estimates;
after updating of offset estimates or if observability is not met, then compensate sensor signal with the offset output from the adaptive filter.

7. The method of claim 1, further comprising the steps of receiving a third sensor signal dependent on a third physical parameter affecting the condition of the wheeled vehicle and recursively filtering said third sensor signal together with said first and second sensor signals by means of said adaptive filter, which is based on a model that also is dependent on said third physical parameter and on the offset error for said third sensor signal.

8. The method of claim 1, wherein said filter is based on a model that also is dependent on measurement noise in the sensor signals respectively and further comprises the step of calculating and eliminating the measurement noise of the calculated physical parameter value signal.

9. The method of claim 1, wherein said filter is based on a recursive least means square algorithm (RLS).

10. The method of claim 1, wherein said filter is based on a least means square algorithm (LMS).

11. The method of claim 1, wherein said filter is based on a Kalman filter.

12. The method of claim 11, wherein said Kalman filter is specified by means of a state space equation of the form:

$$x(t+1)=Ax(t)+Bv(t)$$

$$y(t)=Cx(t)+e(t)$$

where the covariance matrices of v(t) and e(t) are denoted Q and R, respectively, and wherein the unknown quantities in a state vector x(t) are estimated by a recursion:

$$\hat{x}(t+1)=A\hat{x}(t)+K(t;A,B,C,Q,R)(v(i)-C\hat{x}(t))$$

where the filter gain K(t;A,B,C,Q,R) is given by predetermined Kalman filter equations.

13. The method of claim 12, wherein said Kalman filter incorporates a model for the variation of the true physical parameter value of the wheeled vehicle.

14. The method of claim 1, further comprising the steps of:
examining the data quality according to predetermined rules;
producing statistical matrices for Kalman filtering dependent on said rules.

15. The method of claim 14, wherein said rules are:
if (velocity estimate <LOW_LEVEL) (then increase values in Kalman measurement covariance matrix R and
if (velocity estimate=ABSOLUTE_ZERO) (then decrease values in Kalman measurement covariance matrix R.

16. The method according to claim 1, further comprising applying Kalman filter equations by means of the steps of:
time updating the Kalman filter $$x\text{hat}=F*x\text{hat};$$

$$P\text{hat}=F*P\text{hat}*F'+G*Q*G';$$

measurement updating the Kalman filter $$K=P\text{hat}*H'*\text{inv}(H*P\text{hat}*H'+R);$$

$$e=y-H*x\text{hat};$$

$$x\text{hat}=x\text{hat}+K*e;$$

$$P\text{hat}=P\text{hat}-K*H*P\text{hat}';$$

$$P\text{hat}=0.5*(P\text{hat}+P\text{hat}');$$

where xhat is the current state estimate and Phat is the current Kalman error covariance matrix, y is the current measurement, H is measurement matrix, F is state space model update matrix and G is noise update matrix.

17. The method of claim 1, further comprising pre-processing raw sensor data by scaling sample sensor signals to physical constants according to the model such that each physical constant is set equal to a nominal scale factor multiplied with the raw sensor data value minus a nominal sensor offset.

18. The method of claim 17, further comprising pre-processing raw sensor data by low-pass filtering sensor signal values in order to reduce quantisation errors and noise errors.

19. The method of claim 1, further comprising pre-processing raw sensor data by rotationally synchronising clock stamps from cog-wheels by calculating wheel angular velocity to avoid cog deformity error effects.

20. The method of claim 1, further comprising the step of providing an offset estimate to said sensor signals for use in diagnosis functions.

21. The method of claim 1, further being adapted for determining the yaw rate of said wheeled vehicle,
wherein said first sensor signal is a yaw rate signal from a yaw rate gyro mounted in the wheeled vehicle;
wherein said second sensor signals are angular wheel velocity signals from angular wheel velocity sensors mounted in the wheeled vehicle for sensing the angular velocity of the wheels respectively;
wherein said model is dependent on said yaw rate signal, said angular wheel velocity signals, the offset error for the yaw rate signal and the offset errors for the angular wheel velocity signals; and
wherein said delivered physical parameter value signal is a calculated yaw angle and a calculated yaw rate signal.

22. The method of claim 21, further comprising the steps of
receiving a third sensor signal dependent on a third physical parameter affecting the condition of the wheeled vehicle and recursively filtering said third sensor signal together with said first and second sensor signals by means of said adaptive filter, which is based on a model that also is dependent on said third physical parameter and on the offset error for said third sensor signal;
wherein said third sensor signal is an acceleration signal from an accelerometer mounted in the wheeled vehicle for sensing a lateral acceleration and wherein said adaptive filter is based on a model that is also dependent on said lateral acceleration signal and on the offset error for said acceleration signal.

23. The method of claim 21, further comprising the steps of calculating and eliminating measurement noise from the calculated yaw rate signal.

24. The method of claim 21, wherein said Kalman filter incorporates a model for the variation of the true yaw rate of the wheeled vehicle.

25. The method of claim 21, further comprising the steps of calculating offset errors for said angular wheel velocity signals and calculating the relative difference in wheel radii between right and left wheels dependent on said offset errors for wheel velocity signals.

26. The method of claim 21, further comprising calculating filter input signals and parameters in an error model by the steps of:
calculating an inverse curve radius estimate from front axle wheels of the wheeled vehicle;
calculating an inverse curve radius estimate from rear axle wheels of the wheeled vehicle;
calculating vehicle velocity estimate from the angular wheel velocity sensors;
calculating yaw rate estimates from front and rear wheels;
calculating an error propagation function for wheel radius offsets for a rear axle of the wheeled vehicle;
calculating an error propagation function for wheel radius offsets for a front axle of the wheeled vehicle.

27. The method of claim 21, further comprising the step of providing a fast yaw rate which is the current measured low-pass filtered yaw rate minus the estimated offset for use in time critical control systems.

28. The method of claim 21, further comprising the step of providing a filtered yaw rate which is the current yaw rate state estimate of the Kalman filter.

29. The method of claim 21, further comprising the step of providing relative wheel radii between left and right wheels on rear and front wheelage to be used in a tire pressure estimation system.

30. The method of claim 21, further comprising the step of providing a yaw rate gyro offset estimate to be used in a diagnosis function.

31. The method of claim 1, further adapted for determining longitudinal movement of said wheeled vehicle,
wherein said first sensor signal is an acceleration signal from an accelerometer mounted in the wheeled vehicle;
wherein said second sensor signals are angular wheel velocity signals from angular wheel velocity sensors mounted in the wheeled vehicle for sensing the angular velocity of the respective wheels;
wherein said model is dependent on said acceleration signal, said angular wheeled velocity signals, the offset error for the acceleration signal and the offset errors for the angular wheel velocity signals; and
wherein said delivered physical parameter value signal is a calculated longitudinal velocity signal and a calculated longitudinal acceleration signal.

32. The method of claim 31, wherein the adaptive filter is an extended Kalman filter.

33. The method of claim 31, further comprising the steps of:
receiving a third sensor signal dependent on a third physical parameter affecting the condition of the wheeled vehicle and recursively filtering said third sensor signal together with said first and second sensor signals by means of said adaptive filter, which is based on a model that also is dependent on said third physical parameter and on the offset error for said third sensor signal;
wherein said third sensor signal is a yaw rate signal for the wheeled vehicle and wherein said adaptive filter is based on a model that is dependent also on said yaw rate signal and on the offset error for said yaw rate sensor signal.

34. The method of claim 31, further comprising calculation of filter input signals and parameters in an error model by the steps of:
calculating a vehicle velocity estimate from angular vehicle velocity sensors;
calculating the parameters in the error model;
calculating current matrices for an extended Kalman filter (F,G,H,Q).

35. The method of claim 31, further comprising the step of providing a velocity estimate for a control system and an MMI (Man Machine Interface).

36. The method of claim 31, further comprising the step of providing wheel slip values.

37. The method of claim 31, further comprising the step of providing an accelerometer offset estimate for use in a diagnosis function.

38. The method of claim 1, further being adapted for determining fuel level and fuel consumption of said wheeled vehicle:
wherein said first sensor signal is a fuel volume signal from a tank meter of the wheeled vehicle;
wherein said second sensor signal is a fuel injection sensor signal from the engine of the wheeled vehicle;
wherein said model is dependent on said fuel volume signal, said fuel injection signal, the offset error for the fuel volume signal and the offset error for the fuel offset signal; and
wherein said delivered physical parameter value signal is a calculated fuel level and a calculated fuel consumption signal.

39. The method of claim 38, further comprising calculation of filter input signals and parameters in an error model by the steps of:
calculating a fuel level estimate from the fuel level sensor signal;
calculating the fuel consumption from the fuel injection signal.

40. The method of claim 38, further comprising the steps of:
examining the data quality according to the predetermined rules;
using statistical matrices for Kalman filtering dependent on said rules.

41. The method of claim 40, wherein said rules for examining the data quality is:
if high load on engine then increase part of values in the Kalman measurement covariance matrix R.

42. The method of claim 38, further comprising the step of providing the fuel level estimate for an MMI system (Man Machine Interface).

43. The method of claim 38, further comprising the step of providing a fuel consumption estimate for a control system and an MMI system (Man Machine Interface).

44. The method of claim 1, wherein analytical redundancy is arranged for the adaptive filter by generating a number of equations to process in said filter.

45. An apparatus for calculating a physical parameter value (X) of a wheeled vehicle indirectly using at least two directly measurable input signals, comprising:
(a) a first input sensor signal (y1(t)) that is dependent on a first physical input parameter affecting a condition of the wheeled vehicle;
(b) a second input sensor signal (y2(t)) that is dependent on a second physical input parameter affecting a condition of the wheeled vehicle, wherein the second physical input parameter can be any one of the same as physical parameter value (X), the same as the first physical input parameter, and different from the first physical input parameter;
(c) means for recursively filtering the first and second physical input parameters by means of an adaptive filter based on a predetermined model of the condition of the wheeled vehicle, wherein the input signals to said model include the first physical input parameter (y1(t)), the second physical input parameter (y2(t)), a first offset scaling factor (c1(t)) for the first sensor signal, and a second offset scaling factor (c2(t)) for the second sensor signal, and wherein the model output signals include a first offset error signal (b1(t)) and a second offset error signal (b2(t)), and the physical parameter value (X);
(d) means for estimating the values of said first offset error (b1(t)) and the second offset error (b2(t)) by means of said adaptive filter, wherein at least one offset error relates to the wheel radius; and
(e) means for calculating the physical parameter value (X) using the adaptive filter from the input sensor signals y1(t) and y2(t) such that offset errors in the calculation are compensated for by means of the first and second offset error parameters (b1(t)) and (b2(t)) and the offset scaling factors c1(t) and c2(t).

46. The apparatus of claim 45, further comprising a processing unit (110,112,114,116,117) devised for carrying out the functions related to said means.

47. A computer program directly loadable into the internal memory of a digital computer, comprising program code for calculating a physical parameter value (X) of a wheeled vehicle indirectly using measurable input signals, the program code comprises sets of instructions for:
  (a) receiving a first input sensor signal (y1(t)) that is dependent on a first physical input parameter affecting a condition of the wheeled vehicle;
  (b) receiving a second input sensor signal (y2(t)) that is dependent on a second physical input parameter affecting a condition of the wheeled vehicle, wherein the second physical input parameter can be any one of the same as physical parameter value (X), the same as the first physical input parameter, and different from the first physical input parameter;
  (c) recursively filtering the first and second physical input parameters by means of an adaptive filter based on a predetermined model of the condition of the wheeled vehicle, wherein the input signals to said model include the first physical input parameter (yl(t)), the second physical input parameter (y2(t)), a first offset scaling factor (c1(t)) for the first sensor signal, and a second offset scaling factor (c2(t)) for the second sensor signal, and wherein the model output signals include a first offset error signal (b1(t)) and a second offset error signal (b2(t)), and the physical parameter value (X);
  (d) estimating the values of said first offset error (b1(t)) and the second offset error (b2(t)) by means of said adaptive filter, wherein at least one offset error relates to the wheel radius; and (e) calculating the physical parameter value (X) using the adaptive filter from the input sensor signals y1(t) and y2(t) such that offset errors in the calculation are compensated for by means of the first and second offset error parameters (b1(t)) and (b2(t)) and the offset scaling factors c1(t) and c2(t).

48. A method of calculating a physical parameter value (X) of a wheeled vehicle indirectly by recursively filtering at least two measurable input sensor signals, comprising the steps of:
  processing a plurality of input sensor signals (y1(t),y2(t)) that are dependent on first and second physical input parameters respectively that affect a condition of the wheeled vehicle;
  recursively filtering the first and second physical input parameters by means of an adaptive filter based on a predetermined model of the condition of the wheeled vehicle, wherein the input signals to said model include the first physical input parameter (y1(t)), the second physical input parameter (y2(t)), a first offset scaling factor (c1(t)) for the first sensor signal, and a second offset scaling factor (c2(t)) for the second sensor signal, and wherein the model output signals include a first offset error signal (b1(t)) and a second offset error signal (b2(t)), and the physical parameter value (X);
  estimating the values of said first offset error (b1(t)) and said second offset error (b2(t)) by means of recursively filtering with an adaptive filter, wherein at least one offset error relates to the wheel radius;
  calculating one or more physical parameter value (X) signals using the adaptive filter; and
  using the first and second offset errors (b1(t),b2(t)) to adjust the physical parameter values (X) to a value that is more representative of its actual value.

* * * * *